(12) United States Patent
Elliott et al.

(10) Patent No.: US 8,484,284 B2
(45) Date of Patent: Jul. 9, 2013

(54) HANDHELD WIRELESS GAME DEVICE SERVER, HANDHELD WIRELESS DEVICE CLIENT, AND SYSTEM USING SAME

(75) Inventors: Scott Elliott, Snoqualmie Pass, WA (US); Aaron J. Peterson, Kirkland, WA (US)

(73) Assignee: Nintendo Co., Ltd., Redmond, WA (US)

( * ) Notice: Subject to any disclaimer, the term of this patent is extended or adjusted under 35 U.S.C. 154(b) by 1316 days.

(21) Appl. No.: 12/184,690

(22) Filed: Aug. 1, 2008

(65) Prior Publication Data

US 2009/0037526 A1 Feb. 5, 2009

Related U.S. Application Data

(60) Provisional application No. 60/953,819, filed on Aug. 3, 2007.

(51) Int. Cl.
*G06F 15/16* (2006.01)

(52) U.S. Cl.
USPC .......................................... 709/203; 709/218

(58) Field of Classification Search
USPC ................................................. 709/203, 218
See application file for complete search history.

(56) References Cited

U.S. PATENT DOCUMENTS

| | | | | |
|---|---|---|---|---|
| 6,542,491 | B1 * | 4/2003 | Tari et al. | 370/338 |
| 6,603,984 | B2 * | 8/2003 | Kanefsky | 455/566 |
| 8,005,892 | B2 | 8/2011 | Cheng | |
| 8,121,642 | B2 | 2/2012 | James et al. | |
| 2003/0157959 | A1 | 8/2003 | Makela et al. | |
| 2008/0274792 | A1 * | 11/2008 | Walker et al. | 463/25 |

FOREIGN PATENT DOCUMENTS

| | | |
|---|---|---|
| EP | 1 617 604 A1 | 1/2006 |
| JP | 2002-043219 | 2/2002 |
| JP | 2005-319135 | 11/2005 |
| WO | WO 03/058475 | 7/2003 |
| WO | WO 2007/022489 | 2/2007 |

OTHER PUBLICATIONS https://www.aa.com/content/travelInfomiation/duringFlight/gateConnect.jhtml, Aug. 1, 2007.
NFS: Network File System Protocol Specification, Network Working Group Request for Comments: 1094; Sun Microsystems, Inc., Mar. 1989.
Japanese Official Action dated Sep. 13, 2012 in Japanese Application No. 2008-200169.

(Continued)

*Primary Examiner* — Adnan Mirza
(74) *Attorney, Agent, or Firm* — Nixon & Vanderhye P.C.

(57) ABSTRACT

A handheld wireless device is adapted to function as a light-weight, small, and low-cost wireless server for serving handheld wireless clients. The handheld wireless server includes a battery that powers the server, data processing circuitry, read/write memory, and a memory port for receiving an external, detachable, long term, read/write storage device. The read/write storage device stores multiple dynamic server applications for execution by the data processing circuitry and multiple dynamic client applications for download to handheld wireless client devices. Wireless communications circuitry broadcasts initial information and detects communications from handheld wireless client devices including requests to download one of the client applications stored on the long term storage device. The data processing circuitry processes, in parallel, multiple download requests for client applications from multiple handheld client devices, retrieves the client applications from the long term storage device, and provides the client applications wirelessly to the multiple handheld client devices. An example application for traveler in a travel environment is described.

37 Claims, 20 Drawing Sheets

OTHER PUBLICATIONS

European Communication, Dec. 29, 2011, in corresponding EP Application No. 08252618.7-1244.
European Search Report and Search Opinion dated Apr. 5, 2012 in EP Application No. 08252618.7.
Gareth Edwards, Nintendo DS to Function as a Game Server; Oct. 8, 2004, http://www.engadget.com/2004/10/08/nintendo-ds-to-function-as-a-game-server.

* cited by examiner

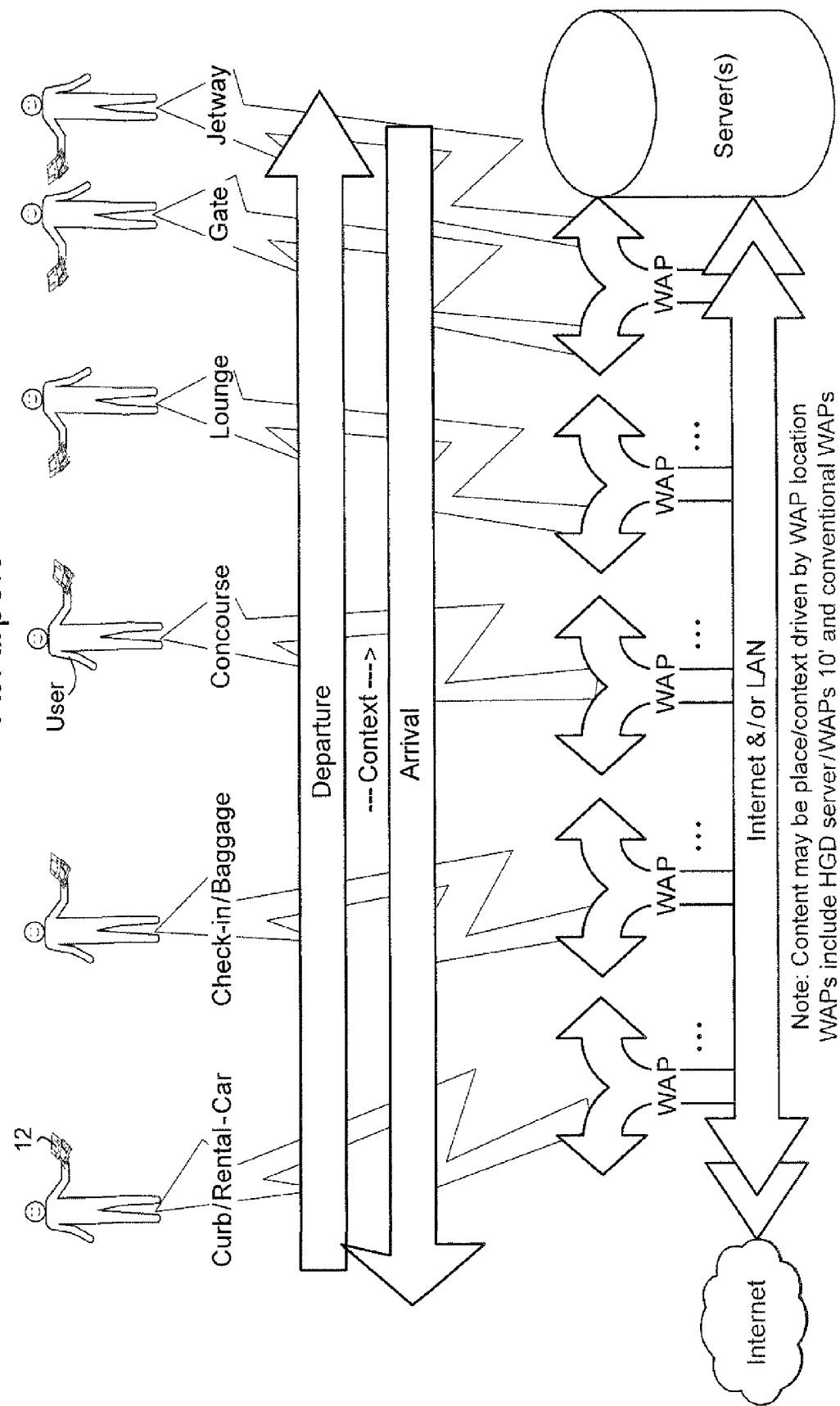

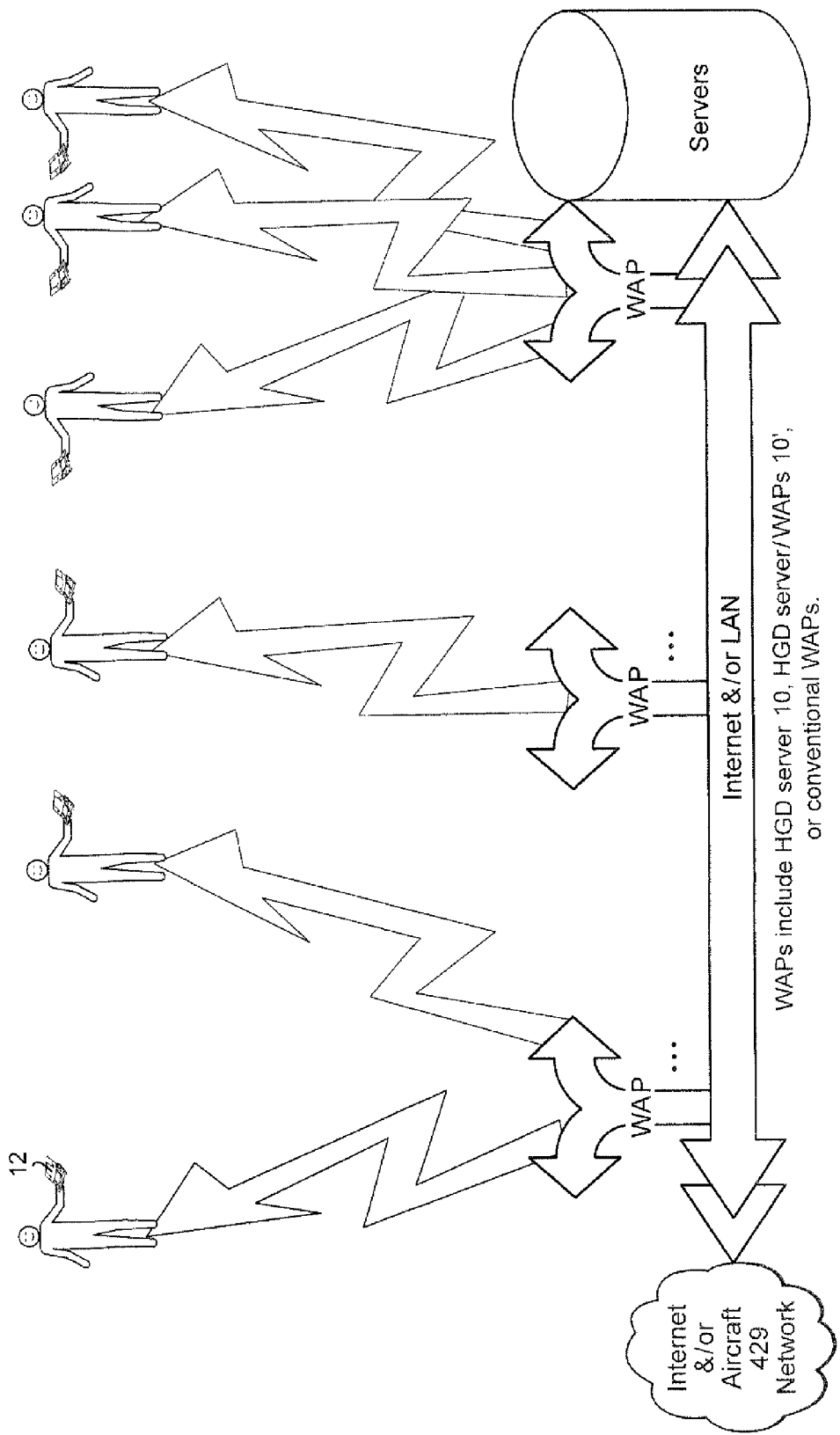

Example Protocol Stack

| Game Machine | Network Packet | UDP | IP | WiFi Driver |
|---|---|---|---|---|
| Access Point | Network Packet | UDP | IP | WiFi Driver |

*FIG. 19A*

Example Protocol Stack

| Game Machine | State Machine | UDP | IP | WiFi Driver |
|---|---|---|---|---|
| Access Point | Network Packet | UDP | IP | WiFi Driver |

*FIG. 19B*

Network Packet Format

- 16 bit header
  - o 2 bit Camera Number
  - o 2 bit Data Type (01 = Camera data)
  - o 12 bit Sequence number
- data size determined by video encoding Example UDP Data Format

| 16 bit source port number | 16 bit destination port number |
|---|---|
| 16 bit UDP length | 16 bit UDP checksum |
| Data (if any) - variable length ||

FIG. 21

Example IP Header

| 4 bit version | 4 bit header length | 8 bit type of service (TOS) | 16 bit total length (in bytes) ||
|---|---|---|---|---|
| 16 bit Identification ||| 3 bit flags | 13 bit fragment offset |
| 8 bit time to live (TTL) || 8 bit protocol | 16 bit header checksum ||
| 32 bit source IP Address |||||
| 32 bit destination IP Address |||||
| Options (if any) - variable length |||||
| Data - variable length |||||

FIG. 22

HANDHELD WIRELESS GAME DEVICE SERVER, HANDHELD WIRELESS DEVICE CLIENT, AND SYSTEM USING SAME

PRIORITY APPLICATION

This application is claims priority from U.S. provisional patent application Ser. No. 60/953,819, filed on Aug. 3, 2007, the contents of which are incorporated herein by reference.

RELATED APPLICATION

The application is related to commonly-assigned U.S. patent application Ser. No. 11/507,019, filed on Aug. 21, 2006, the entire contents of which are incorporated herein by reference.

TECHNICAL FIELD

The technical field relates to server-client technology that employs embedded systems and wireless communications.

BACKGROUND AND SUMMARY

Wireless communication and wireless communication devices are now commonplace in modem society. "Wireless" refers to the fact that these devices communicate with other devices over an air interface rather than a wired interface. Telephones, PDAs, MP3 players, and gaming devices are some examples of portable, battery-powered wireless devices. These wireless devices can be "client" devices that obtain some kind of service from one or more server devices, usually via a communications network. For example, a mobile phone connects to a mobile phone network to obtain telephone service in order to make a telephone call. Portable wireless client devices are small and lightweight to allow users to easily carry such a device virtually anywhere, power efficient in order to conserve battery life, and relatively inexpensive to make them affordable by most consumers. But the same is not true for server devices. To the contrary, servers are typically relatively large and heavy computers that require considerable amounts of power to operate, and by comparison to portable consumer wireless devices, are at least an order of magnitude more expensive.

These differences stem from the different functions that portable client devices perform and those that server computers perform. Servers are typically general purpose computing systems that include general purpose computing circuitry, communications circuitry, considerable amounts of working memory as well as long term memory, e.g., hard disk memory. Extensive operating system software and application software are provided. In contrast, there is much less hardware and software in portable client devices, which are streamlined to provide one or a few very focused or dedicated tasks. A portable client device may be viewed as a simple "embedded device" designed to do some specific task rather than be a general purpose computer for multiple tasks. An embedded device usually has low or no performance requirements, allowing the system hardware and software to be simplified to reduce costs such as limited memory, bandwidth, simple or no user interface features, simple or no operating system software, simple applications (applets), etc.

Given the ubiquitous nature of portable wireless devices, it is desirable to provide many servers in many different locations to serve clients in those locations and to be able to connect servers together and to other networks. But to do that, there is a need for cheaper, smaller, and lighter servers. These characteristics are particularly important in situations where small size, low weight, and/or low power are important or desired, e.g., in an air or other travel context. The following description often refers to an air travel context for purposes of illustration, but the technology here can be used to advantage in any server context. The description sometimes refers to handheld wireless gaming servers and clients, but the technology may also be used with other types of handheld or embedded wireless devices.

A handheld wireless device is adapted to function as a portable handheld wireless server for serving handheld wireless clients. A handheld device is of a size and weight that permits easy holding in one hand and normal operation using fingers of one or both hands. Most laptop computers, in contrast, are sized to be operated on top of a person's lap or some other surface, rather than be held and operated by the hand(s) during normal operation. The handheld wireless server includes a battery that powers the server components which include data processing circuitry, read/write memory, and a memory port for receiving an external, detachable, long term, read/write storage device. The long term, read/write storage device stores multiple dynamic server applications for execution by the data processing circuitry and multiple dynamic client applications for download to one or more of the handheld wireless client devices. The term "dynamic" means that the applications can be changed or modified during normal operation without having to turn off and/or re-boot the handheld wireless server device. The handheld wireless server also includes wireless communications circuitry that broadcasts initial information and detects communications from handheld wireless client devices including requests to download one of the client applications stored on the long term storage device. The data processor processes, in parallel, multiple download requests for one or more of the client applications from multiple handheld wireless client devices, retrieves the client applications from the long term storage device operably coupled to the memory port, and provides the client applications wirelessly to the multiple handheld wireless client devices.

In one example embodiment, the handheld wireless device server is an embedded device adapted to perform predetermined server functions. One specific but non-limiting example of a handheld wireless device used as a server is a Nintendo DS. In one example implementation, the Nintendo DS includes a boot cartridge port for receiving a boot cartridge that is configured to initialize the Nintendo DS to function as a wireless access point and a flash memory cartridge is received at the memory port to serve as the long term, read/write storage device. The handheld wireless clients may be (but do not have to be) gaming clients, and at least one server application starts the client applications when provided to the handheld wireless client devices. For example, the handheld wireless gaming clients may also be Nintendo DSs. As one non-limiting example of small size and lightness, the handheld wireless client device without the long term storage device operably coupled to the memory port may weigh no more than 10 ounces and may have dimensions no greater than 3.5" in width, 6" in length, and 1.25" in thickness.

Although the long term storage device may be flash memory, it could be a hard disk or other suitable memory. The long term storage device may be configured as a card, cartridge, disk, chip, or stick, and the memory port is sized to receive the card, cartridge, disk, or stick.

In one non-limiting implementation of the handheld server, the processing circuitry includes a first data processor for executing a kernel and network drivers, a second data processor for executing a kernel, server applications, and a graphics processing unit for processing two-dimensional and three-dimensional images.

The wireless circuitry preferably wirelessly communicates with one or more other wireless servers in order to wirelessly receive one or more applications from the other portable wireless servers and/or to wirelessly transmit one or more applications to the other portable wireless servers. In one example implementation, the portable wireless servers are located on a transport vehicle such as an airplane, ship, bus, train, subway, etc. In that case, the wireless circuitry preferably wirelessly communicates with another wireless access point on the transport vehicle that is part of a transport vehicle network. In another example, the wireless circuitry wirelessly communicates with another wireless access point that is coupled to the Internet so that at least some client applications can be retrieved from a content server connected to the Internet.

It may be useful for the wireless circuitry to wirelessly communicate with another wireless access point using a first wireless protocol and to communicate with the handheld wireless clients using a second wireless protocol. For example, the first wireless protocol can be a standardized wireless protocol and the second wireless protocol a proprietary protocol. A non-limiting example of a standardized wireless protocol is an 802.11 protocol, but other standardized wireless protocols could be used.

In the case where the handheld server device is to communicate using a standardized protocol, that protocol may be modified in order to communicate information that is specific to the handheld wireless gaming devices. For example, the wireless circuitry transmits a beacon signal that includes information about client applications that can be downloaded to the handheld wireless client devices.

Another aspect of this technology relates to a handheld wireless terminal for use by a traveler in a wireless network provided in a travel environment. The handheld wireless terminal wirelessly communicates with different wireless access points each associated with a different location in the travel environment. The handheld wireless terminal includes a battery, data processing circuitry, read/write memory, and wireless communications circuitry. The wireless communications circuitry receives broadcast information including client application indicators from a wireless access point, requests download of one a plurality of client applications based on the broadcast information received from the wireless access point, and receives the requested client application downloaded from the wireless access point. The handheld wireless terminal includes an interactive interface that changes depending on the location in the travel environment of the wireless access point with which the portable handheld wireless gaming terminal communicates.

In one non-limiting example implementation, the interactive interface comprises two separate display screens. Preferably, the interactive interface changes in accordance with an interface application settings downloaded from the wireless access point with which the handheld wireless terminal communicates. For example, different wireless access points download different interface applications that reflect a stage associated with the travel environment including a pre-travel stage, a during-travel stage, and a post-travel stage. If the travel environment includes air travel, then the pre-travel stage includes the traveler arriving at and moving through an airport terminal, the travel stage includes the traveler located in an airplane, and the post-travel stage includes the traveler departing the airport terminal.

Applications downloadable from the wireless access points include one or more of the following: streaming video, video games, video game demos, head to head interactive video games, high scores for video games, contests for highest video game score, outside plane video, traveler check-in, map of airport terminal, directions to a terminal gate, other flight information and options, delays, cancellations, map of flight path, flight progress details, connecting flight details, directions to taxis, rental cars, hotels, and possible activities and events at the traveler's destination, advertisements, on-plane shopping, information videos such as safety and destination, food and beverage ordering, travel guides, electronic copies of an in-flight magazine, foreign language instructions, web access, flight attendant call, overhead reading light control, restroom empty status, or warning to wrap up current activity based on altitude or time to landing.

In one non-limiting example embodiment, one or more of the wireless access points is a portable handheld wireless device operating as wireless access point as well as a server. For example, the portable handheld wireless device operating as a wireless access point is a Nintendo DS device. The portable handheld wireless device operating as a wireless access point preferably also operates as an application server to the portable handheld wireless gaming terminal.

Another aspect of this technology relates to a communications system comprising multiple handheld wireless gaming devices wirelessly linked together. Each handheld wireless gaming device functions as a server to multiple handheld wireless gaming terminals. Each handheld wireless gaming device includes a battery, data processing circuitry, read/write working memory, long term, mass read/write storage storing multiple server applications for execution by the data processing circuitry and multiple client applications for download to one or more of the handheld wireless client devices, wireless communications circuitry that transmits broadcast information, receives requests from multiple ones of the handheld wireless gaming terminals to download one or more client applications, and transmits the requested client applications to the requesting handheld wireless gaming terminals. Each handheld wireless gaming terminal includes a battery, data processing circuitry, read/write working memory, wireless communications circuitry that receives broadcast information from one of the handheld wireless gaming devices, transmits a request to the one handheld wireless gaming device to download of one a plurality of applications, and receives the requested application downloaded from the one handheld wireless gaming device.

At least some of the handheld wireless gaming devices download applications to others of the handheld wireless gaming devices. A local area network may also be provided that includes multiple wireless access points that communicate wirelessly with the handheld wireless gaming devices and with the handheld wireless gaming terminals. In this way, the handheld wireless gaming devices may communicate with an application content server via the local area network or the Internet.

BRIEF DESCRIPTION OF THE DRAWINGS

FIGS. 8A-8C illustrate one non-limiting example application of the communications system shown in FIG. 7 to an air travel environment to provide multiple services to travelers having a handheld wireless terminal that can communicate with any of the wireless access points in FIG. 7;

FIGS. 19A and 19B show example protocol stacks;

FIG. 21 shows an example UDP data format; and

FIG. 22 shows an example IP header.

DETAILED DESCRIPTION

Figure 1:
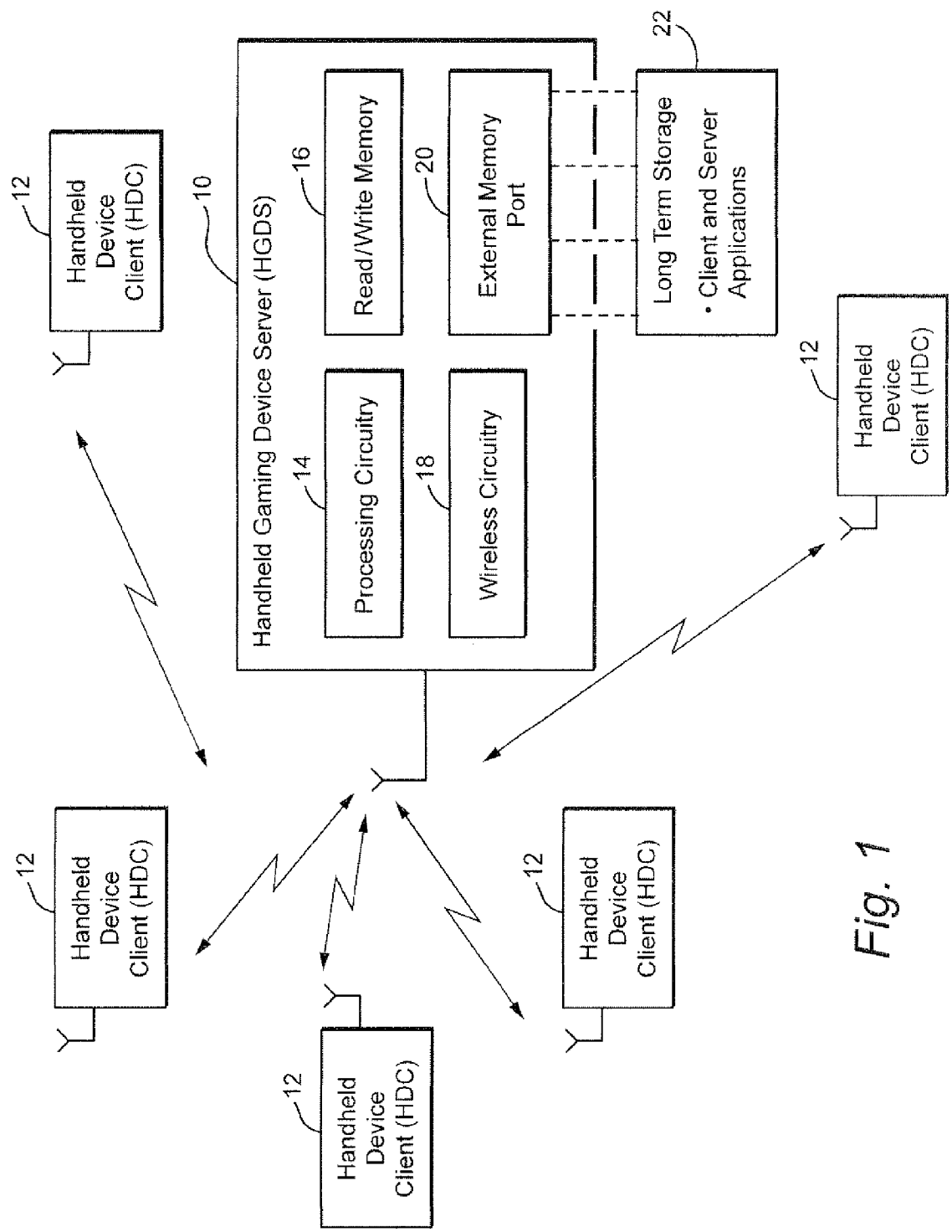
FIG. 1 illustrates a non-limiting example communications system where a handheld device functions as a server to multiple handheld device clients over a wireless interface.

In the following description, for purposes of explanation and non-limitation, specific details are set forth, such as particular nodes, functional entities, techniques, protocols, standards, etc. in order to provide an understanding of the described technology. It will apparent to one skilled in the art that other embodiments may be practiced apart from the specific details disclosed below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs).

Generally speaking, the systems, methods, and techniques described herein may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program or script of instructions to perform desired functions by operating on input data and generating appropriate output. The techniques may be implemented in one or more computer programs or scripts that are executable on a programmable system including at least one programmable processor coupled to receive data and instructions from, and to transmit data and instructions to, a data storage system, at least one input device, and at least one output device. Suitable processors include, by way of example, both general and special purpose microprocessors. Generally, a processor will receive instructions and data from a read-only memory and/or a random access memory. Storage devices suitable for tangibly embodying computer program instructions and data include all forms of volatile and non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits). The computer program instructions or scripts may also be provided as data signals embodied in a carrier wave or other propagation medium via a communication link (e.g., a modem or wired or wireless network connection).

FIG. 1 illustrates a non-limiting example communications system where a handheld gaining device functions as a server to multiple handheld gaming device clients over a wireless interface. A handheld gaming device adapted to be a server is shown at 10 with the acronym HGDS standing for handheld gaming device server. Although a gaming device is illustrated and described here for purposes of explanation, other types of handheld wireless devices may also be adapted to be servers.

The handheld gaming device server 10 includes processing circuitry 14 read/write working memory 16, wireless circuitry 18, and an external memory port 20 that is capable of receiving a long term storage device 22 that stores both client and server applications. An application is a computer program designed to help users of client devices perform a certain type of work as opposed to system software such as operating systems and kernel software that is involved in integrating a computer's various capabilities. The applications are dynamic in the sense that they can be changed or modified without having to turn off an re-boot the handheld gaming device server 10. The long term storage 22 may be a flash memory, a hard disk, or some other suitable memory, and may be configured as a card, a cartridge, a disk, or a stick. The memory port 20 is sized to receive the particular size or shape of the long term storage 22. The handheld gaming device server 10 communicates wirelessly via wireless circuitry 18 and an antenna over a wireless interface with multiple handheld device clients (HDC) 12. The handheld gaming device server 10 may be an embedded device that has been adapted to perform predetermined server functions.

Figure 2:
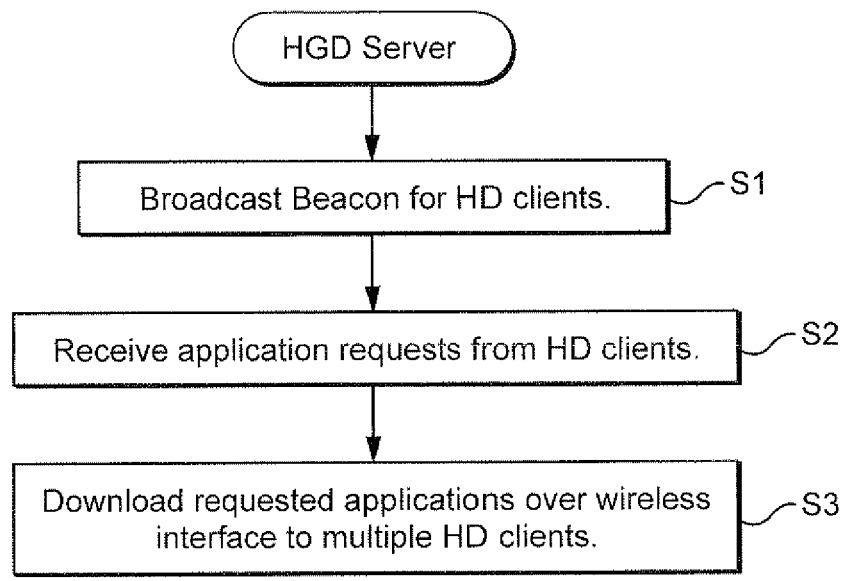
FIG. 2 is a flow chart illustrating example procedures that may be performed by the handheld device server shown in FIG. 1.

FIG. 2 is a flowchart illustrating example procedures that may be performed by the handheld gaming device server shown in FIG. 1. The server 10 broadcasts a beacon over the wireless interface intended for the handheld device clients (step S1). Requests for one or more specific client applications and information are received from handheld device clients (step S2). In response, the server downloads the requested client applications and information over the wireless interface to multiple handheld device clients (step S3).

In one example embodiment, a handheld device server is an embedded device adapted to perform predetermined server functions. One specific but non-limiting example of such an embedded device adapted to be used as a server is the Nintendo DS gaming device shown in FIG. 3. The Nintendo DS, referred to generally by reference numerals 10 and 12 to indicate that the Nintendo DS may be used as a handheld wireless server or a handheld wireless client, includes a memory port 20 corresponding to a memory cartridge slot. A cartridge adaptor, which has components 24 and 26, is provided to operably couple a compact flash memory card 22 to the data processing circuitry inside the Nintendo DS device. The cartridge adaptors 24 and 26 are designed so that an off-the-shelf compact flash memory card can be read from and written to by the processing circuitry in a Nintendo DS configured as a server.

Figure 3:
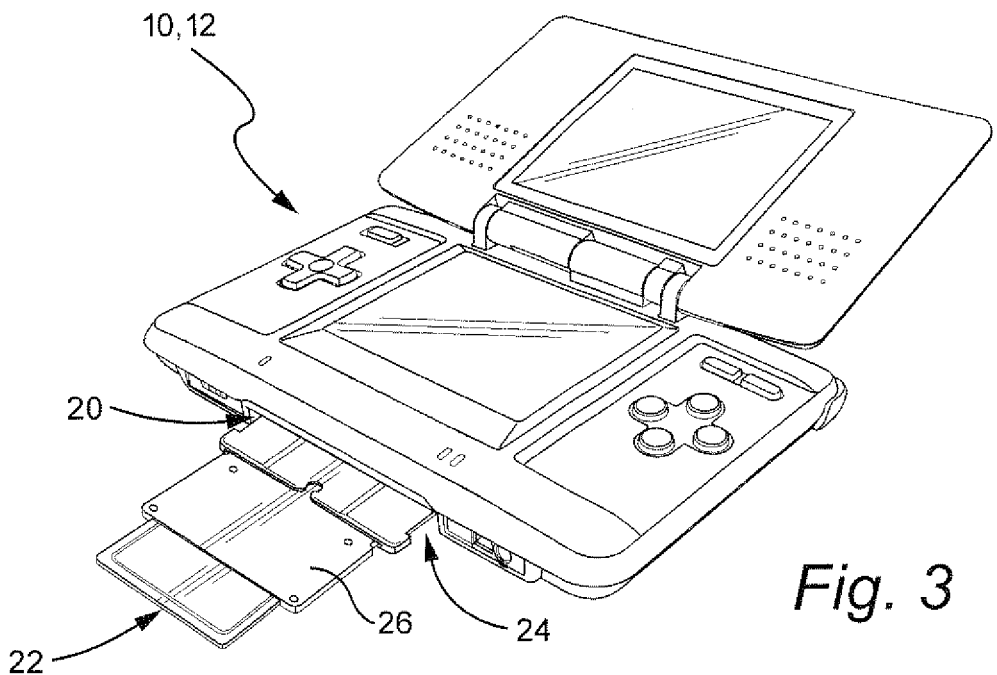
FIG. 3 is a function block diagram of a non-limiting example embodiment of a Nintendo DS adapted to be a handheld device server.

The Nintendo DS server shown in FIG. 3 is one example of a small size, inexpensive, and light handheld wireless server device. For example, the Nintendo DS without the long term storage device coupled to the memory port weighs no more than 10 ounces and has dimensions no greater than 3.5 inches in width, 6 inches in length, and 1.25 inches in thickness. The Nintendo DS Lite is even lighter and smaller in size. The cartridge adaptor 24 and 26 as well as the compact flash memory 22 do not add significantly to the weight or the size of the Nintendo DS server.

In an example embodiment, the handheld wireless server device 10 performs three server functions: multiboot, streaming video, and file and content serving. Multiboot means to download and start a client application from a single client or multiple client devices in parallel (e.g., 15 client devices) and is handled by a multiboot application running on the server device processing circuitry 14. Thus, the multiboot application also handles the client download requests for the initial multiboot download. The multiboot application permits a client device to join in the middle of a download and then finish the rest after the end of the application file is reached. The multiboot application causes beacon-type wireless signals to be broadcast by the wireless circuitry 18 to notify nearby clients of its presence, to provide information needed for the client terminals to synchronized and communicate wirelessly with the server device, and to provide an indication of applications and other information that the server can send to the client devices. To allow for dynamic loading of applications both on the server and client devices, applications are preferably constructed with position independent code (PIC) and position independent data (PID), which allows for multiple applications and multiple instances of applications to be run in parallel. The downloaded software is preferably digitally signed to prevent unauthorized software from being loaded onto the client device.

Figure 7:
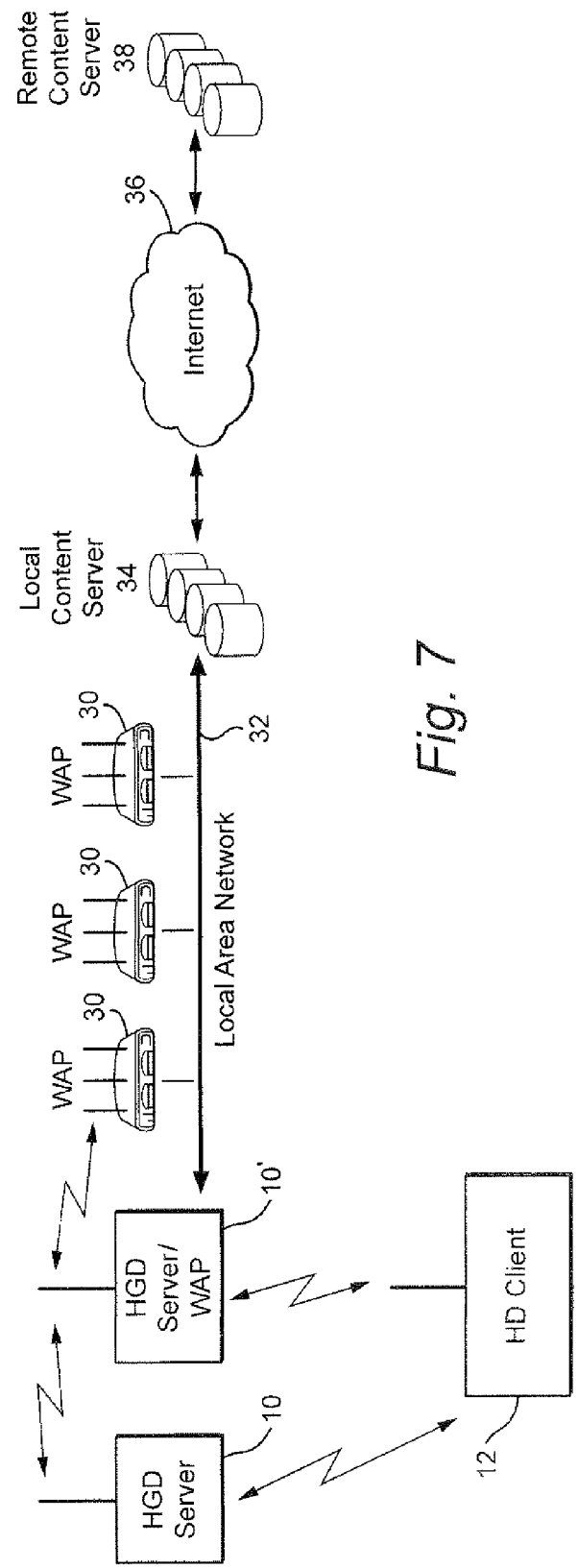
FIG. 7 illustrates a non-limiting example communications system where multiple handheld gaming devices (HGDs) each function as servers and as wireless access points to a local area network of wireless access points and to other servers/networks.

Streaming video may be served by handheld wireless server device 10 shown in FIG. 1 or by a local or remote server 34 or 38 coupled to a wireless local area network 32 transmitted via a wireless access point as shown in FIG. 7 described below. The handheld wireless server device 10 also acts as a file server for serving out data, such as application data, library data, and other data files. This file server function may be handled by an application running on the handheld wireless server device 10. In one example implementation, the file server application creates a network bridge between the remote files on the handheld wireless server device 10 and the local file requests on the handheld client.

Figure 4:
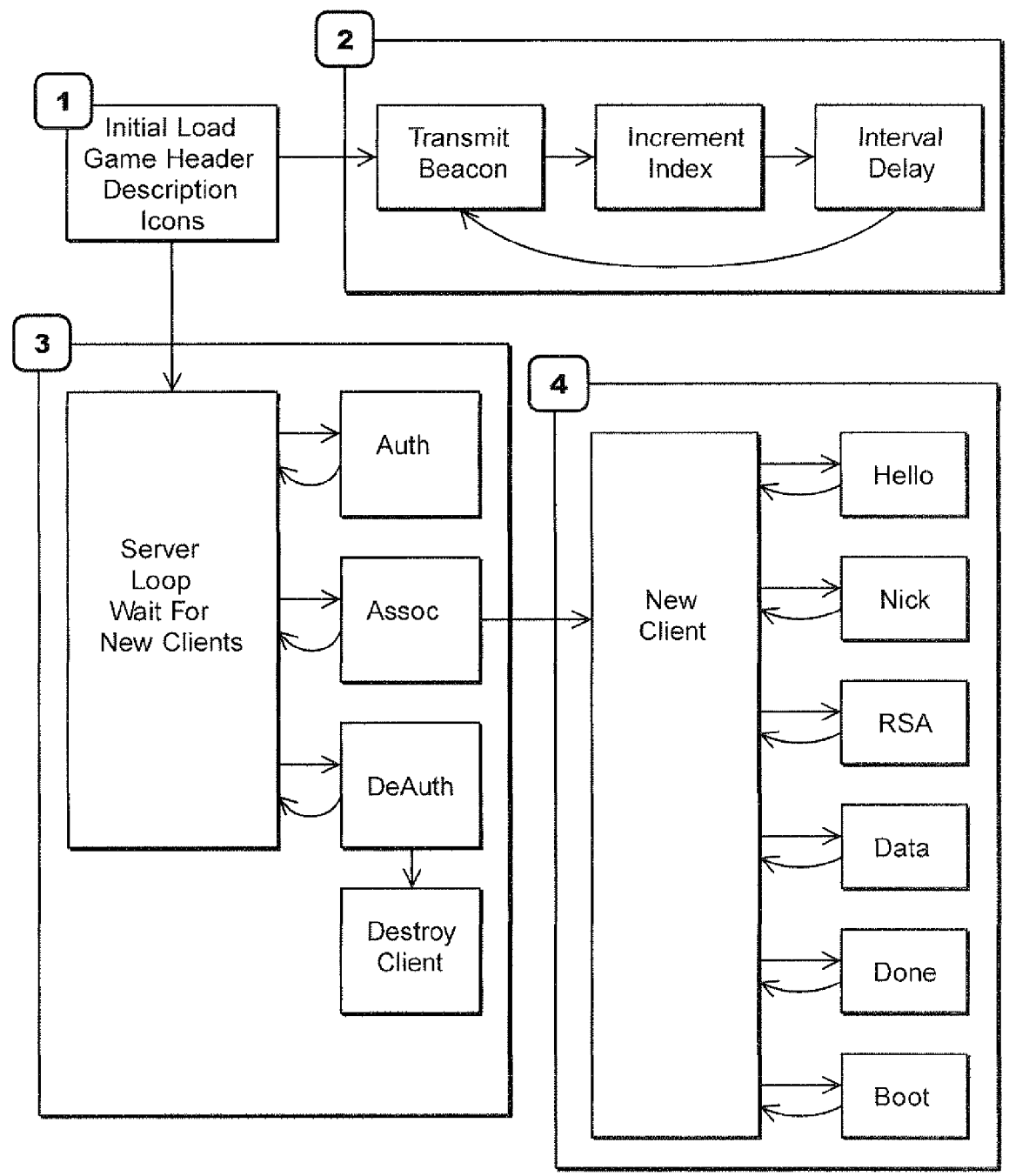
FIG. 4 is a diagram of non-limiting example multiboot application that may be executed by the Nintendo DS server.

FIG. 4 is a diagram of non-limiting example multiboot application that may be executed by the Nintendo DS server. At point 1 in FIG. 4, an initial load operation occurs where the Nintendo DS server generates information about each game or other application to be broadcast to client devices. Often, the applications like game applications are too large to keep in memory 16, so just key information like segment size and memory load locations, along with a game indication or description, and game representational icons are stored in memory 16. Once the broadcast beacon header is assembled during the initial load, at point 2, the wireless circuitry 18 transmits the beacon. Embedded in the beacon may be other pieces of information, e.g., the number of players connected to the server, unique download identifiers, and banner data which may contain game icons, title, and/or description. Such banner data may be too large to fit in a single beacon, and as a result, only a parts of the data may be transmitted in each beacon. The multiboot application increments the index to the next portion of the data, until all the banner data has been transmitted, then the index resets to zero. The beacons are transmitted at a periodic interval, e.g., every 200 ms until all the banner data has been transmitted, then the process repeats. At point 3, a server access point loop waits for authentication requests from clients. When a client wants to download an application or other information from the Nintendo DS server, assuming for this example an 802.11 type wireless protocol, it sends a 802.11 AUTH request. After the Nintendo DS server responds, the client sends an ASSOCIATION request, and the Nintendo DS server responds telling the client that it is now associated with the Nintendo DS server as an access point. A new client instance is created on the server to track the state of the downloading client. When the client is finished downloading, it sends a DeAuth message, and the server cleans up the client instance. The client instances are also cleaned up, when the multiboot application has not heard from the client for an extended period, e.g., 60 seconds. Point 4 is a server-client receive point. The Nintendo DS server handles packets received for each client instance. For each message received, the Nintendo DS server looks at the passed state information and updates the client's data state accordingly. The Hello function performs the initial connection to the Nintendo DS server. The Nick function includes several packets that make up a client's nickname, which is used to assign a name to each client that can be used by the server, or may be used to display a name when interacting with other clients on the network. RSA passes a security signature information about the downloaded file. The Data function passes back the next block that the downloading client is requesting. This data function may also be used to inform the server of missed blocks during the download. The Done and Boot functions are the final operations used to signal download completion.

Figure 5:
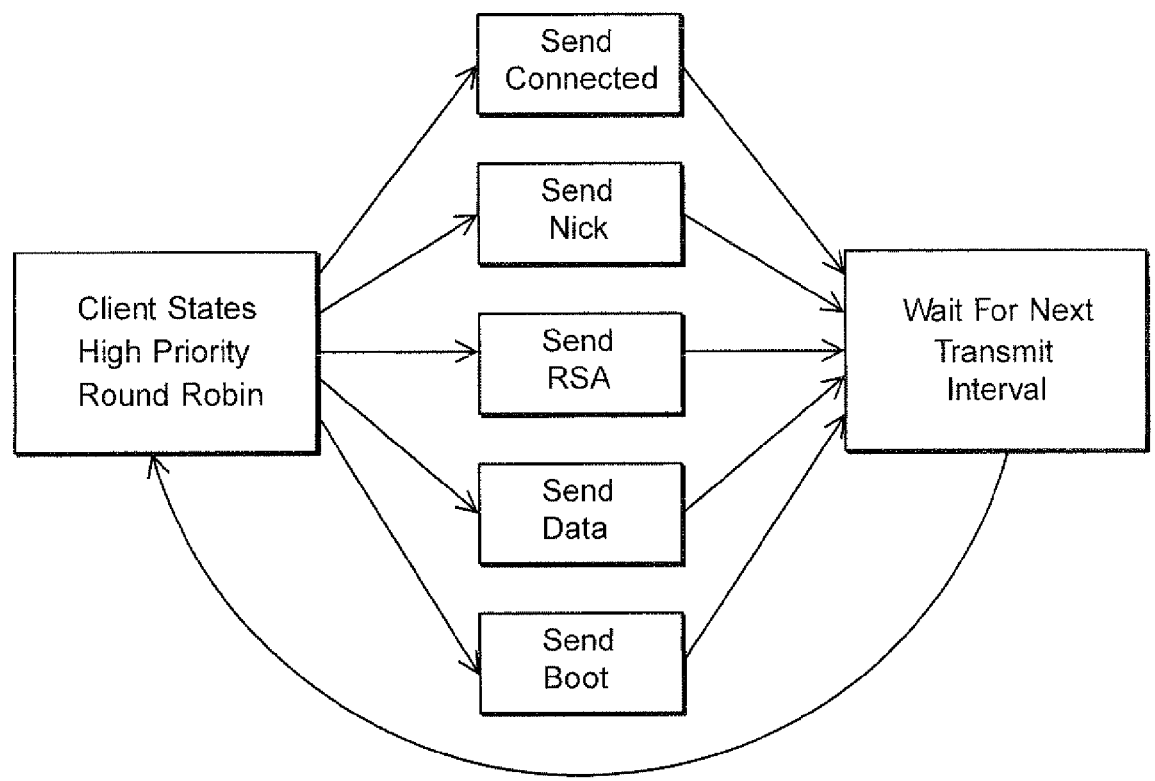
FIG. 5 is a diagram of non-limiting example messages transmitted by a Nintendo DS server to download data to multiple DS clients in parallel.

FIG. 5 is a diagram of non-limiting example messages transmitted by a Nintendo DS server to download data to multiple DS clients in parallel. The Client States/High Priority Round Robin functionality goes through a list of all the client devices making requests and their states and then chooses which request has the highest priority. Priorities are preferably rotated to avoid issues with a stalled or slightly out of range client device. The next blocks represent send messages that include five data messages sent from the Nintendo DS server. The Send Connected message acknowledges the initial wireless connection with a client device. The Send Nick message acknowledges receiving the client's nickname. The Send RSA message sends to the client a digital encryption signature information about the file the client requested be downloaded. The Send Data message is the most common transmission with each packet containing a chunk of the information being downloaded, and the Send Boot message triggers the client device to run the downloaded application. In the Wait For Next Transmit Interval process, the server waits for an acknowledgement ACK from each client transmitted, or times out after a short duration (e.g., 40 ms) in the event all the ACK packets were not received. Then the processing circuitry proceeds back to the start to send another packet.

Figure 6:
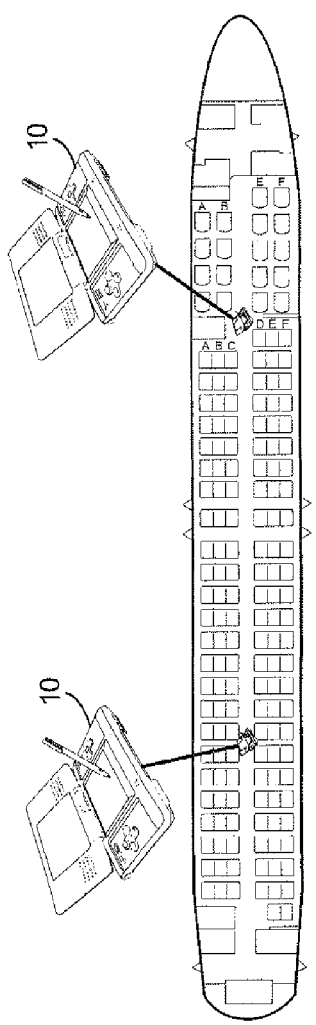
FIG. 6 shows a non-limiting example application for one or more Nintendo DS servers in a passenger transport vehicle.

FIG. 6 shows a non-limiting example application of one more Nintendo DS servers in a transport vehicle. Specifically, the transport vehicle shown at 28 is a top down view of the cabins of an airplane. Two Nintendo DS server devices 10 are shown positioned in the central aisle of the aircraft 28. Such handheld wireless server devices can be placed in many suitable locations including under a passenger seat, in a storage bin, or even in flight attendant's food cart. Because the handheld server device is battery-operated, there is no need to provide power or cabling from the aircraft's power generation system. Since the handheld server devices 10 are quite small and light weight, there impact on the aircraft's weight and storage capacity—extremely important factors in aircraft travel—are very small. Moreover, the low power level wireless transmissions to and from the handheld server devices 10 typically do not have an impact on the aircraft communications. Passengers within the aircraft receive broadcasts from the handheld wireless servers 10, make application requests, and receive downloads from the server device without requiring FAA or other governmental approval or licenses. Similar advantages apply to other types of transport vehicles including ships, trains, buses, subways, etc.

In another example embodiment, there may be other wireless access points on the transport vehicle that are part of a transport vehicle's network. For example, airlines often have what is referred to as a 429 communications network which may include one or more wireless access points. Accordingly, the wireless circuitry in the handheld gaming device server 10 can communicate with such a wireless access point to obtain access to other client applications and/or information that can be retrieved from a content server connected to that transport vehicle network and/or connected to the Internet or other external network.

FIG. 7 illustrates a non-limiting example communication system for multiple handheld gaming devices each functioning as a server and as a wireless access point to a local access network of wireless access points and to other servers/networks. Specifically, a handheld gaming device server/wireless access point (WAP) 10' wirelessly communicates with another handheld gaming device server 10, a handheld device client 12, and one or more wireless access points (WAP) 30 coupled to a local area network 32. Local content servers 34 are connected to the local network 32 as is the Internet 36. Remote content servers 38 are coupled to the Internet 36. In this way, the handheld game device server 10 and the handheld device client 12 can have access to content, streaming media, etc. provided by local content server 34 or a remote content 38 by communicating with the handheld gaming device server/WAP 10'. It may be useful for the wireless circuitry in the handheld gaming device server/WAP 10' and/or the server 10 to communicate with the wireless access point 30 using a first standardized wireless protocol employed, for example, in the local area network 32 and to communicate with the handheld wireless clients 12 using a proprietary protocol. A non-limiting example of a standardized wireless protocol is an 802.11 protocol, but other standardized wireless protocols could be used. In this situation, the handheld gaming device server/WAP 10' may modify the standardized protocol in certain ways to communicate information that is specific to the handheld wireless client devices 12. For example, the wireless circuitry in the handheld gaming device server/WAP 10' may transmit a beacon, e.g., a customized 802.11 type beacon that includes information about client applications that can be downloaded to the handheld wireless client devices 12.

In a situation where the handheld client communicates with a traditional WAP, there may be a need to modify the WAP in some way. For the Nintendo DS example, modifications need to be done to enable a conventional WAP to serve as a multiboot application server for Nintendo DS clients. The multiboot application must be ported to run on the WAP hardware. Modifications are then performed on the WAP's network driver, network stack, transmission timings, and receive paths. These modifications enable the WAP to broadcast changeable and customized beacon packets, to serve multiboot download data to the Nintendo DS, and to handle the transmissions of a customized data protocol. Transmission timing modifications may be needed to enable multiple access points to be present on a single WAP, where one example design is as a single access point with fixed beacons.

Figure 8A:
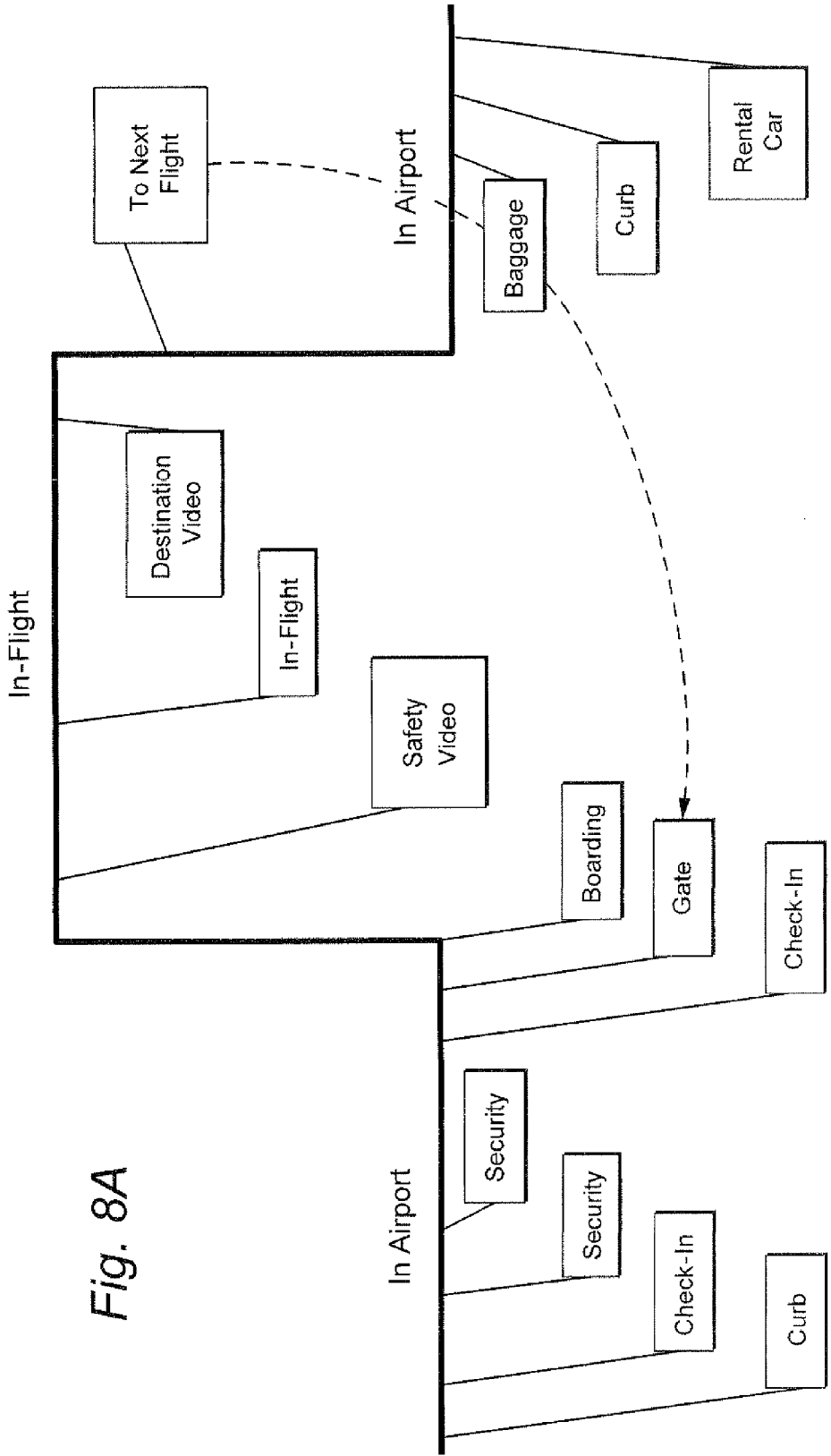

FIGS. 8A-8C illustrate one non-limiting example application of the communications system shown in FIG. 7 to an air travel environment to provide multiple services to travelers having a handheld wireless gaming terminal that can communicate with any of the wireless access points shown in FIG. 7. This travel application also applies to travelers while traveling via trains, train stations, buses, bus stations, cruise ships, and the like. Those skilled in the art will appreciate that the principles described here also may be used in any traveling context where wireless service can be provided.

FIGS. 8A-8C help show how information and entertainment can be provided to travelers via handheld wireless client terminals from curbside to cruise altitude and back to curbside. An interactive wireless network serves handheld wireless devices, one example of which is a Nintendo DS, that are served from one or more wireless access points to provide interactive entertainment such as games, trivia, video, gate/flight information, order food and the ability to interact with the airline reservation system for check-in, gate assignments, seat assignments, food ordering, weather, etc. The Nintendo DS is used only as one non-limiting example of a portable handheld wireless device. Existing entertainment designs may also be used and updated via handheld wireless server or client devices.

Non-limiting example content options include: streaming video, video games, video game demos, head to head interactive video games (server mediated or peer-to-peer), flight high scores for video games, contests for highest video game score, outside (pilots view) video, traveler check-in, map of airport, directions to the gate, other flight information and options, delays, cancellations, map of flight, flight progress detail (time to destination, etc), connecting flight detail, including that passenger's connecting flight, gate, time and terminal map, directions to taxis, rental cars, hotels, and possible activities and events at the passenger's destination, ads, on plane shopping (in flight and home delivery), information videos such as safety and destination (this content may be forced by the aircraft/crew), food and beverage ordering, travel guides, electronic copies of in-flight magazine, foreign language instruction, web access, either sandbox with on-aircraft working or via SAT/terrestrial RF link to the Internet, flight attendant call, overhead reading light control, restroom empty status, pre-10,000 foot (or other altitude) warning to wrap up current activity, and 10,000 ft (or other altitude) automatic content termination.

Additional features may include one or more of the following: the ability of the aircraft/crew to pause the content for PA announcements and to terminate the content/application for take-off/landing to meet regulatory requirements; the ability of the client device to be handed out by the airline or for the passengers to use a commercially available device such as a Nintendo DS; users can not save client software when the power is turned off to assure greater security; downloading of client software for each use to assure that only current client software is used; and digitally-signed software to prevent use of unauthorized client software.

Returning to the non-limiting example in FIGS. 8A-8C, the wireless user network is located in airport terminals and in airplanes. An interactive interface and related applications may be provided in various ways to the handheld client terminal. By way of example without limitation, the interface and applications may be downloaded when the handheld client terminal communicates with a handheld wireless server or connects to a wireless access point. In an alternative implementation, various interfaces and/or applications may be stored in memory (removable or non-removable) of the handheld client terminal. The handheld client terminal may then receive interface designating data from a wireless access point designating particular interface(s) and/or application(s) which are then executed.

The handheld client terminal can decode and display video feeds as well as download a local specific persona along with interactive applications that allow location unique interactivity in the form of games, puzzles, prizes and such. When the handheld client terminal is in range of wireless access points, it will be able to download some or all of the look and feel of its current surroundings and the necessary interface in a way that seamlessly blends to its new environment. That look and feel may change when the terminal moves to different environment.

In the example illustrated in FIGS. 8A-8C, a traveler or user carries a portable handheld wireless gaming terminal that connects to the wireless network via a wireless link to one of the access points located at various positions throughout the airport terminal, any transport vehicles used in the airport, and the airplane. The number and position of the wireless access points depend on a variety of factors such as the desired amount of network coverage, governmental regulations, cost, likely radio conditions, etc. The wireless access points are connected in a wired or wireless manner to an airplane system server which is preferably connected to the Internet.

FIG. 8A shows a traveler moving from the curb of the airport, through check-in and security, at the gate, boarding, on the plane with a safety video, in-flight entertainment and information, and a destination video, and at a destination airport picking up baggage, exiting the airport and moving to a rental car facility. All during this process, the passenger has wireless service and content access via the handheld wireless terminal and the wireless infrastructure in the airports and airplane.

FIG. 8B shows an example of the user/passenger moving through various points in the airport interacting with a Nintendo DS as a preferred example of a wireless handheld terminal. Various wireless access points (WAPs) are positioned in the airport to provide wireless service and connect the user/passenger to the internet and one or more servers via the internet and/or a local area network (LAN). In this way, the WAPs have access to content provider servers such as an airline server and/or a server operated by an entertainment/information provider like Nintendo. As noted in FIG. 8B, the content available or delivered may be place and/or context driven by the location of the closest WAP (but it need not be).

FIG. 8C shows a similar arrangement on an aircraft with WAPs distributed throughout the aircraft. The shape of the aircraft and the passenger seats are not shown. The WAPs are connected to the internet and/or other networks via an aircraft 429 network. In this way, the WAPs have access to content provider servers such as an airline server and/or a server operated by an entertainment/information provider like Nintendo As mentioned above, in particular implementations in which handheld information terminal is adapted to communicate in different wireless modes (e.g., using different protocols or different frequency bands, etc.), communication with a handheld wireless client may use a first wireless communication mode (e.g., a secure, proprietary ad-hoc mode) and communication with wireless access points may use a second wireless communication mode (e.g., a conventional WiFi infrastructure mode). The wireless access point may be connected to the system server or to a separate server for performing the initialization and/or download aspects of the system.

FIGS. 9A-9G are non-limiting example screen shots displayed on an air traveler's handheld gaming terminal as the traveler moves to different locations in a typical air travel environment. The portable handheld wireless gaming terminal wirelessly communicates with different wireless access points, each associated with a different location or environment in the travel environment. The wireless circuitry in the gaming terminal receives broadcast information including client application indicators from a wireless access point, requests download of a client application based on the broadcast information, and receives the requested client application downloading from the wireless access point. The portable handheld wireless gaming terminal includes an interactive interface that changes depending on the location of the travel environment of the wireless access point with which the portable handheld wireless gaming terminal communicates. For example, the interactive interface changes in accordance with an interface application downloaded from the wireless access point with which the portable handheld wireless gaming terminal communicates. Different wireless access points may download different interface applications that reflect the stage associated with the travel environment including a pre-travel stage, a during-travel stage, and a post-travel stage. If the travel environment includes air travel, then the pre-travel stage includes the traveler arriving at and moving through an airport terminal, the travel stage includes the traveler located in an airplane, and the post-travel stage includes the traveler departing the airport terminal.

Figure 9A:
FIGS. 9A-9H are non-limiting example screen shots displayed on an air traveler's handheld gaming terminal as the traveler moves to different locations in a typical air travel environment.
Figure 9B:
Figure 9C:
Figure 9D:
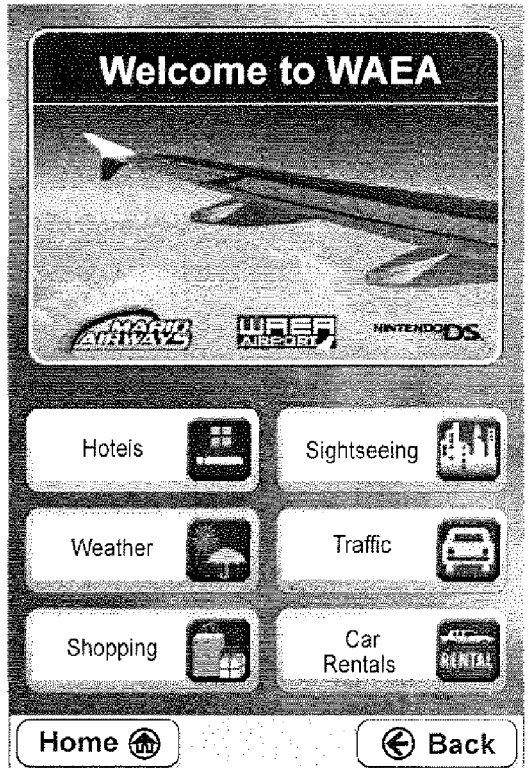

FIGS. 9A-9D show how various interactive interfaces could change depending on the location of the traveler in an airport environment. FIG. 9A shows a screen shot of an interactive interface that could be shown when a traveler first arrives at the airport, and is checking in baggage for flight. The welcome screen to the airport is shown at the top, and buttons "Flight Check-In", "Flight Info", and "Security Wait Time" to permit the user to access information relevant to a specific flight, or time to get through security. FIG. 9B could be shown while the traveler is in the airport terminal waiting for a flight. In this case, the boarding pass button allows the client device to be used as the boarding pass and make for a paperless boarding system. FIG. 9C shows one non-limiting example of how the interactive interface might look during flight. The top of the screen is modified to show the flight progress, and the local airport options are changed to options more suitable for the flight. FIG. 9D shows a non-limiting example of what the interface might look like in the baggage claim are, with car rentals, and with local town information displayed.

Figure 9E:
Figure 9F:
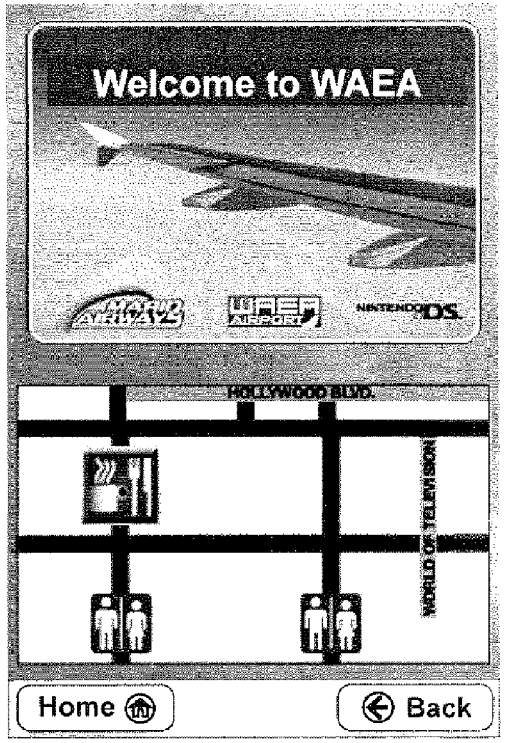
Figure 9G:
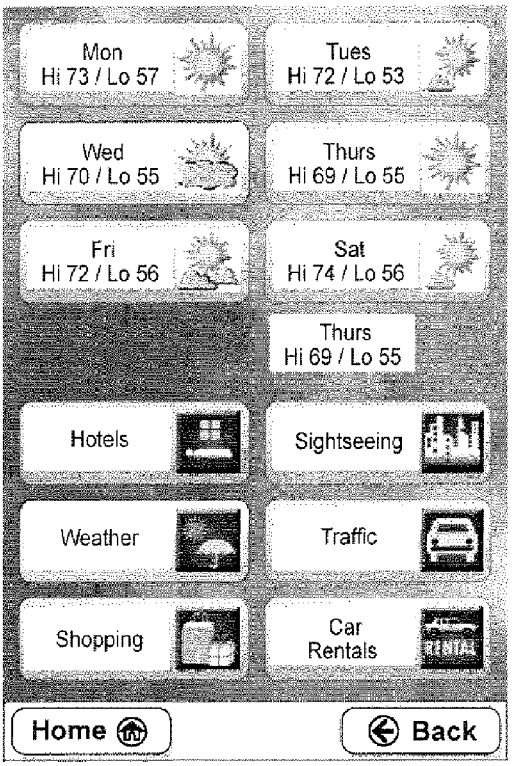
Figure 9H:
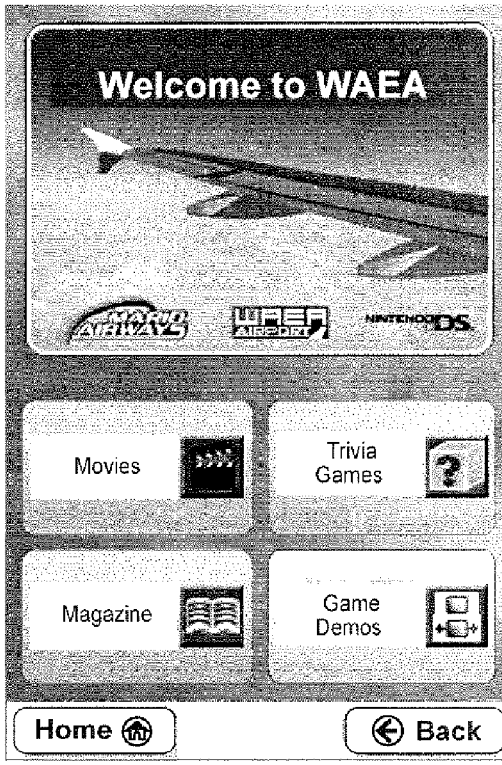

In most of the FIGS. 9A-9H, the browser buttons "home" and "back" shown on the display allow the user to change or direct display images. FIGS. 9E-9H represent various screens that are common, or are adapted to fit a number of different locations. FIG. 9E is a screen shot that is used for airport terminals with location specific buttons such as conference rooms, food and drink, lavatories, lounges, etc. This can also be adapted for use in-flight with buttons such as lavatories—and their occupied or unoccupied status, and various flight-specific luxuries available during the flight. The screen shot in FIG. 9F illustrates using a display map for the terminal locations of lavatories and food and drink. The FIG. 9G display can be provided while the traveler is either within the airplane or at the airline terminal to illustrate real-time weather at either the plane's destination, the weather for the area around the airport terminal, or at other destinations. Other screen buttons identify for the destination of interest items such as hotels, sightseeing, traffic, shopping, car rentals, etc. Pressing any one of those buttons provides relevant information from the appropriate area of interest. FIG. 9H is a screen shot that can be employed at the airport terminal or on the airplane and includes various entertainment options such as movies, trivia games, magazines or other reading material and video games.

The FIG. 9C example screen shot shows an interactive interface shown during a flight. A food button illustrates food selections available during the flight, and a beverages button illustrates the flight specific beverages available. The Connecting Flights and Destination Info provides additional information to various destinations, entertainment like games, videos, and other entertainment options. Safety Info displays various safety features of the aircraft. Various display screens, such as FIGS. 9E-9H, can also be adapted with an in-flight display. Relevant information for such an in-flight display may be obtained from the aircraft's 429 network and communication with an access point located on the passenger's airplane.

Figure 10:
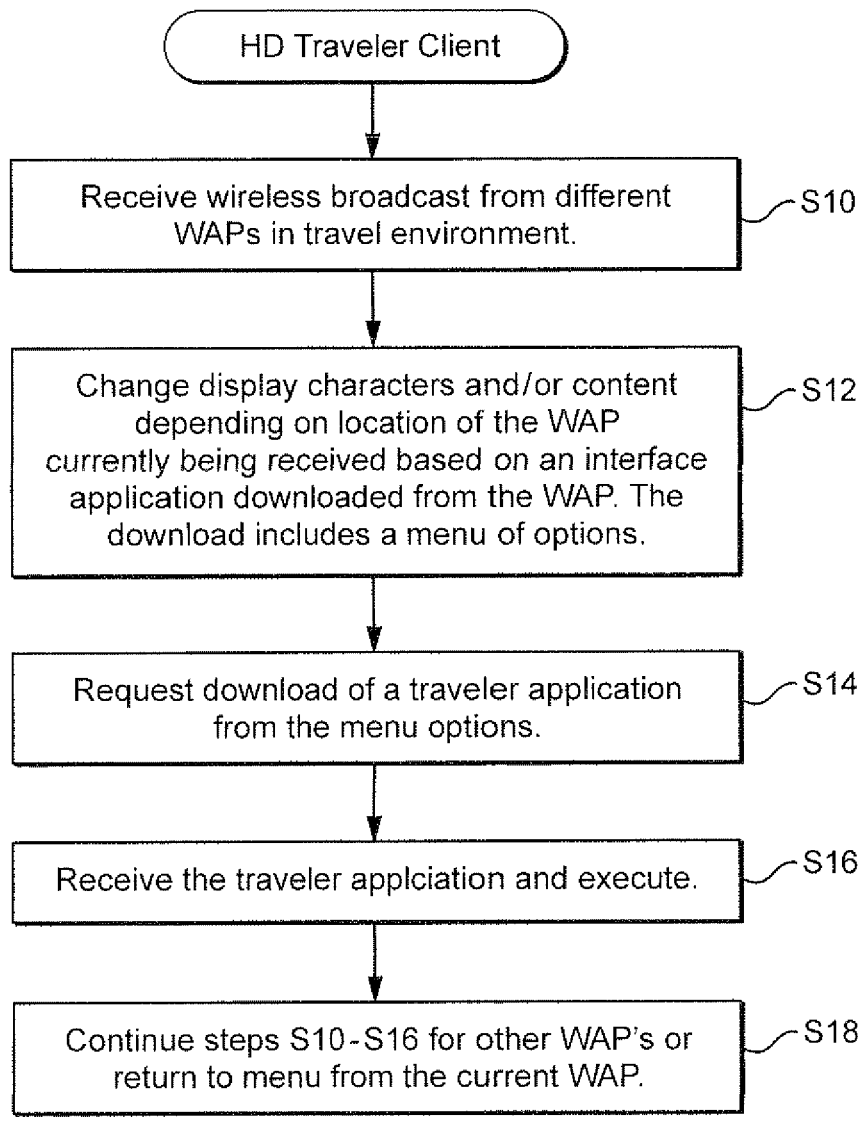
FIG. 10 is a flow chart illustrating example procedures that may be performed by a handheld client terminal in a travel environment.

FIG. 10 is a flowchart illustrating non-limiting example procedures that may be performed by a handheld gaming device client in a travel environment. The handheld client receives wireless broadcast from different wireless access points in the travel environment (step S10). A handheld client changes the display character and/or content depending on the location of the wireless access point currently being received based on an interface application downloaded from the wireless access point (step S12). The download typically includes a menu of options. The handheld client requests download of a traveler application from the menu options (step S14). The requested application is received by the handheld client and executed (S16). Steps S10-S16 are used for communications with other wireless access points, or the handheld client can return to a menu for the current wireless access point (S18).

A non-limiting example of a handheld wireless gaming device that can be used to function as a server (as described above), client (as described above), or both is the Nintendo DS and is now described in further detail in conjunction with FIGS. 11-18. FIG. 3 above illustrates one way the Nintendo DS can be adapted to function as a server. An additional advantage of using such handheld gaming terminal as a handheld wireless client terminal is that there is a large installed base of users each of whom has a device with the same hardware characteristics. As a result, the system and network can be designed for a single hardware platform, thereby simplifying the overall design.

Figure 11:
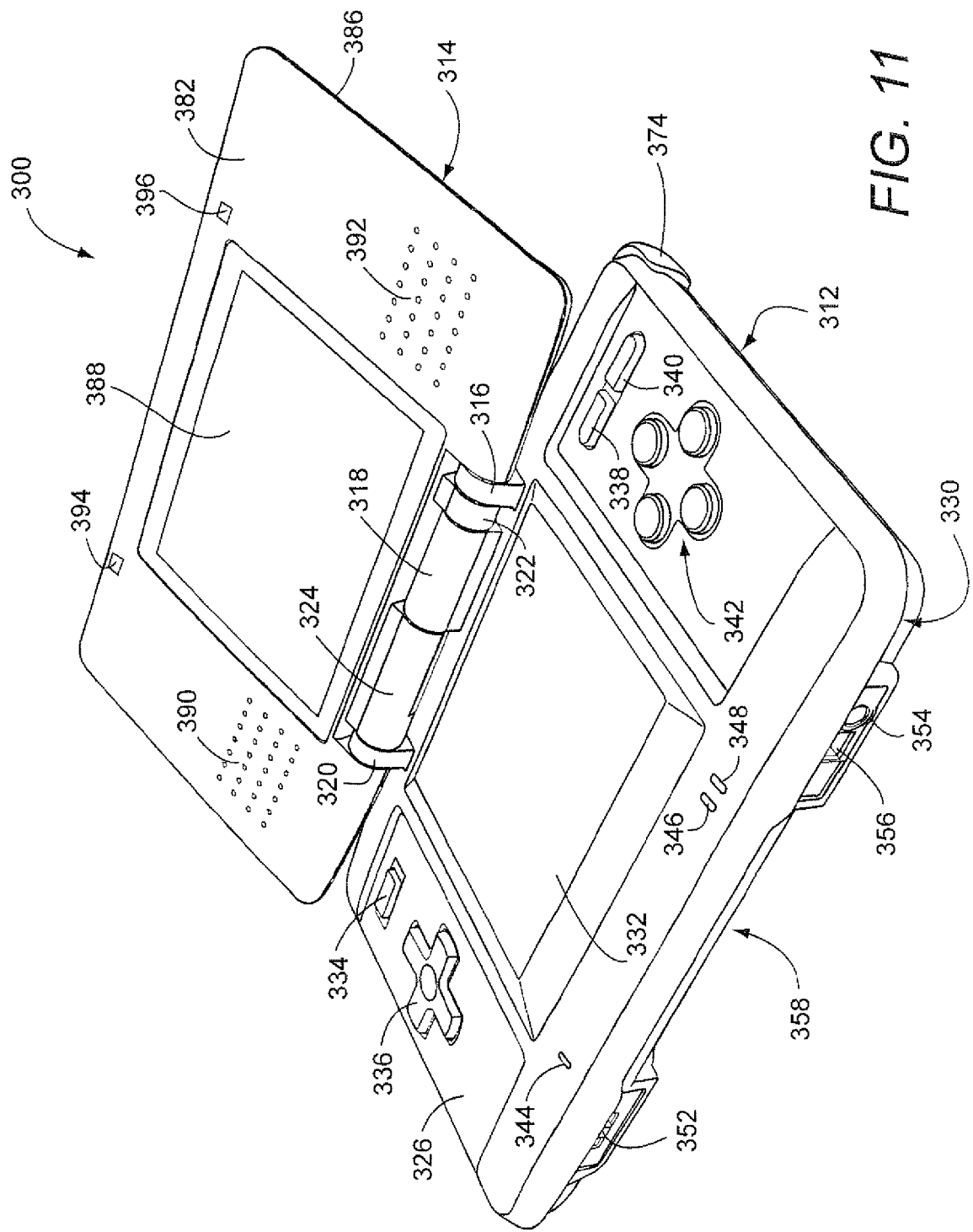
FIG. 11 is a perspective view of a non-limiting example of a handheld gaming device shown in an open, ready-to-use orientation.

FIG. 11 shows a console 300 that includes a main body 312 and a cover body 314 hingedly connected to each other along an upper edge of the main body 312 and a lower edge of the cover body 314 (references herein to terms such as "upper" and "lower" and "forward" and "rearward" are for ease of understanding and are made relative to an orientation of the game system where the cover body 314 is in an open position and the game system is being held by a user in a normal operating position). Hinge elements 316, 318 and 320 on the main body 312 mesh with hinge elements 322 and 324 on the cover body, with a hinge pin (not shown) extending through the aligned hinge elements in conventional fashion. Note that because hinge elements 316, 318 and 320 extend from the upper (or inner) face 326 of the main body 312, the cover body 314 overlies the upper face 326 when the cover body 314 is closed over the main body. When the cover body 314 is in its fully open position, it is substantially parallel to the main body 312 but lies in a substantially parallel, offset plane. The main body 312 also has a lower (or outer) face 328 (FIG. 12) and a peripheral edge 330.

A first display screen 332 is recessed within the upper face 326 of the main body 312 with dimensions of approximately 2½ inches in length and 1⅞ inches in width, yielding a diagonal screen dimension of 3 inches. The screen in an example embodiment is a backlit (e.g., 40 candelas), color liquid crystal display (LCD) with a display resolution of 256×192 dots (aspect ratio 4:3). This screen is touch sensitive and may be activated by a stylus, described further herein. A power button 334 is located in the upper left corner of face 326 and is used to turn the game on and off. A cross-shaped directional control button 336 is located adjacent and below the power button 334, and is used for game play control. More specifically, display screen 332 includes a resistive-membrane touch panel that allows coordinates to be obtained in dot units. The touch panel can be operated with a finger or a stylus.

In the upper right corner of the main body 312, there are side-by-side "start" and "select" buttons 338, 340, respectively, with X/Y/A/B buttons 342 located adjacent and below the "start" and select" buttons. Buttons 338, 340 and 342 are also used for game play control. A microphone 344 (which may be an omni-directional condenser microphone) is located below the left edge of screen 332 for use with specially designed games having a microphone feature. A battery recharge indicator LED 346 and a power indicator LED 348 are also located on the upper face 326, adjacent the lower edge thereof below the right edge of screen 332.

Figure 13:
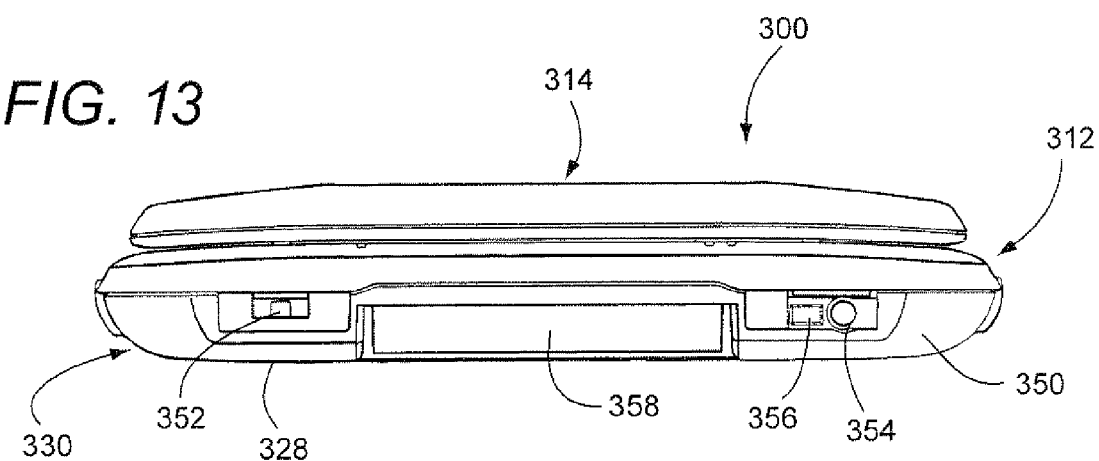
FIG. 13 is a front elevation of the handheld gaming device shown in FIG. 11 shown in a closed position.
Figure 14:
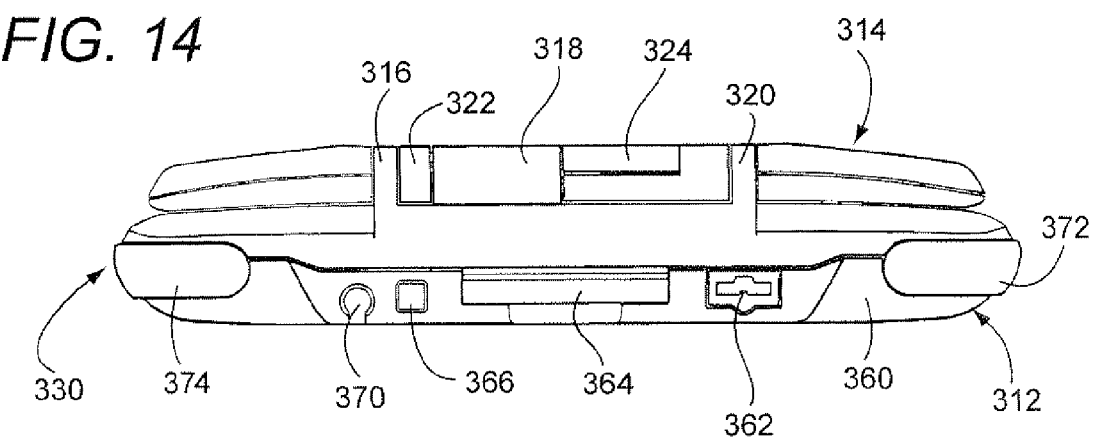
FIG. 14 is a rear elevation of the handheld gaming device shown in FIG. 1.

With reference to FIG. 13, a lower or forward portion 350 of the peripheral edge 330 (closest to the user) is provided with a volume control slide 352 and headphone and microphone connectors 354, 356 on either side of a first game slot 358. Slot 358 is especially designed for larger game cartridges or cards originally designed for use with the assignee's Game Boy Advance game system.

Figure 12:
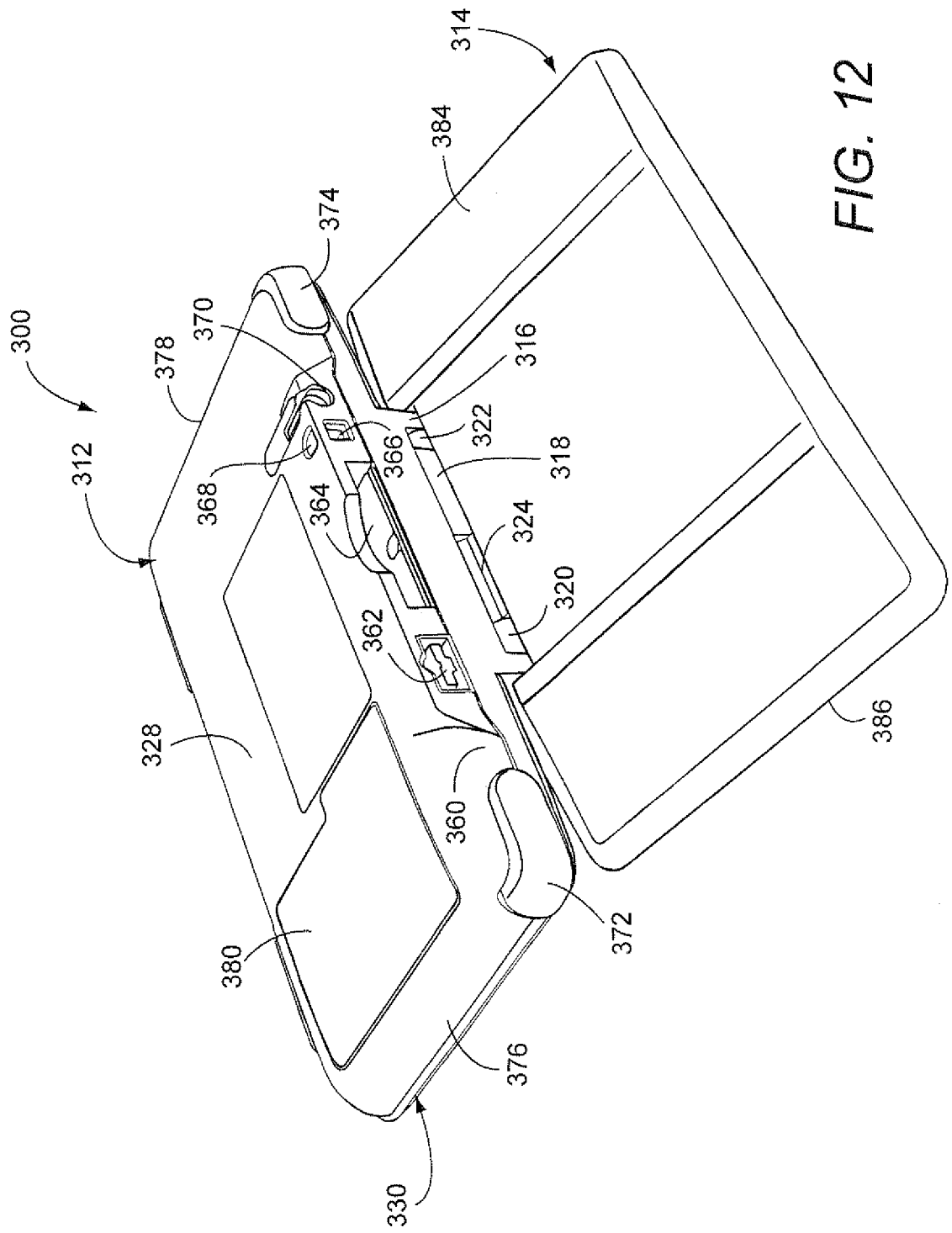
FIG. 12 is a inverted perspective view of the handheld gaming device shown in FIG. 11.
Figure 15:
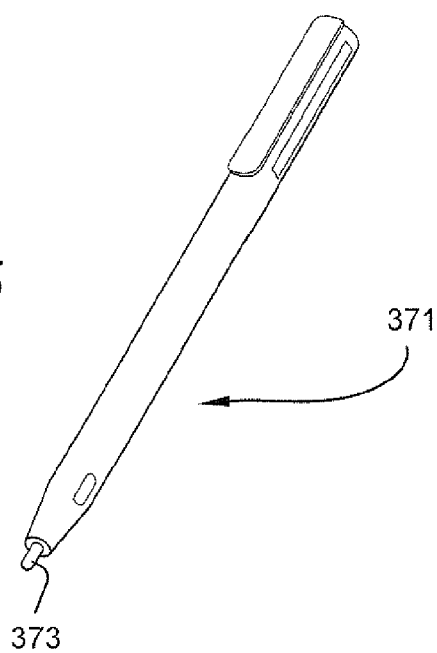
FIG. 15 is a perspective view of a stylus for use with the handheld gaming device shown in FIG. 11.

As seen in FIG. 12, an upper or rearward portion 360 of the peripheral edge 330 is provided with an external extension connector 362 that permits connection to an AC adapter for recharging the internal battery (not shown), or for operating the game using household power. A second game slot 364 in edge portion 360 is designed for receiving memory or game cards especially designed for this game device. The second game slot 364 is smaller than the first game slot 358, reflecting the different sizes of the game cards. Openings 366, 368 form an elbow-shaped through slot adapted for securing a wrist strap (not shown), thereby enabling the user to secure the game device to the body and thus minimize the potential for losing or misplacing the game. A stylus port or holder, in the form of a blind bore 370 is located adjacent the wrist-strap mount for holding a stylus 371 before or after use. As shown in FIG. 15, the stylus 371 is a plastic pencil-shaped device with a rounded tip 373 and is used to activate the touch screen 332.

A pair of left, right control buttons (or shoulder buttons) 372, 374 are located on the peripheral edge 330, at the corners where the upper portion 360 of the peripheral edge 330 meets the side portions 376, 378 of the peripheral edge. The location of these buttons and the location of previously described buttons 334, 336 and 342 facilitate manipulation game control by the user's thumbs and index fingers when the game is held with two hands in a natural and intuitive manner.

The lower (or outer) face 328 of the main body is provided with a battery cover 380 (FIG. 12) for accessing a rechargeable battery pack located within the main body.

The cover body 314 also has an upper (or inner) face 382 (FIG. 11) and a lower (or outer) face 384 (FIG. 12) connected by a peripheral edge 386. The upper face 382 incorporates a second display screen 388 of substantially the same dimensions as screen 332. Screen 388 is also a backlit color LCD. The cover body 314 also incorporates a pair of stereo speakers, with speaker grills 390, 392 located on opposite sides of the screen 388. Dimples or pads 394, 396 may be located above and laterally of screen 388. The dimples may be made of a compressible polymer or other suitable material and serve to dampen engagement of the inner surface 382 of the cover body 314 with the inner surface 326 of the main body 312 when the cover body is closed over the main body. As already noted, the game card slot 358 is sized and adapted to receive a conventional game card designed for the by now well known Nintendo Gameboy Advance System. When the Nintendo DS is adapted to be a server device, the game card slot 358 is used to receive an external long term storage device. See the compact flash memory card shown in FIG. 3.

Figure 16:
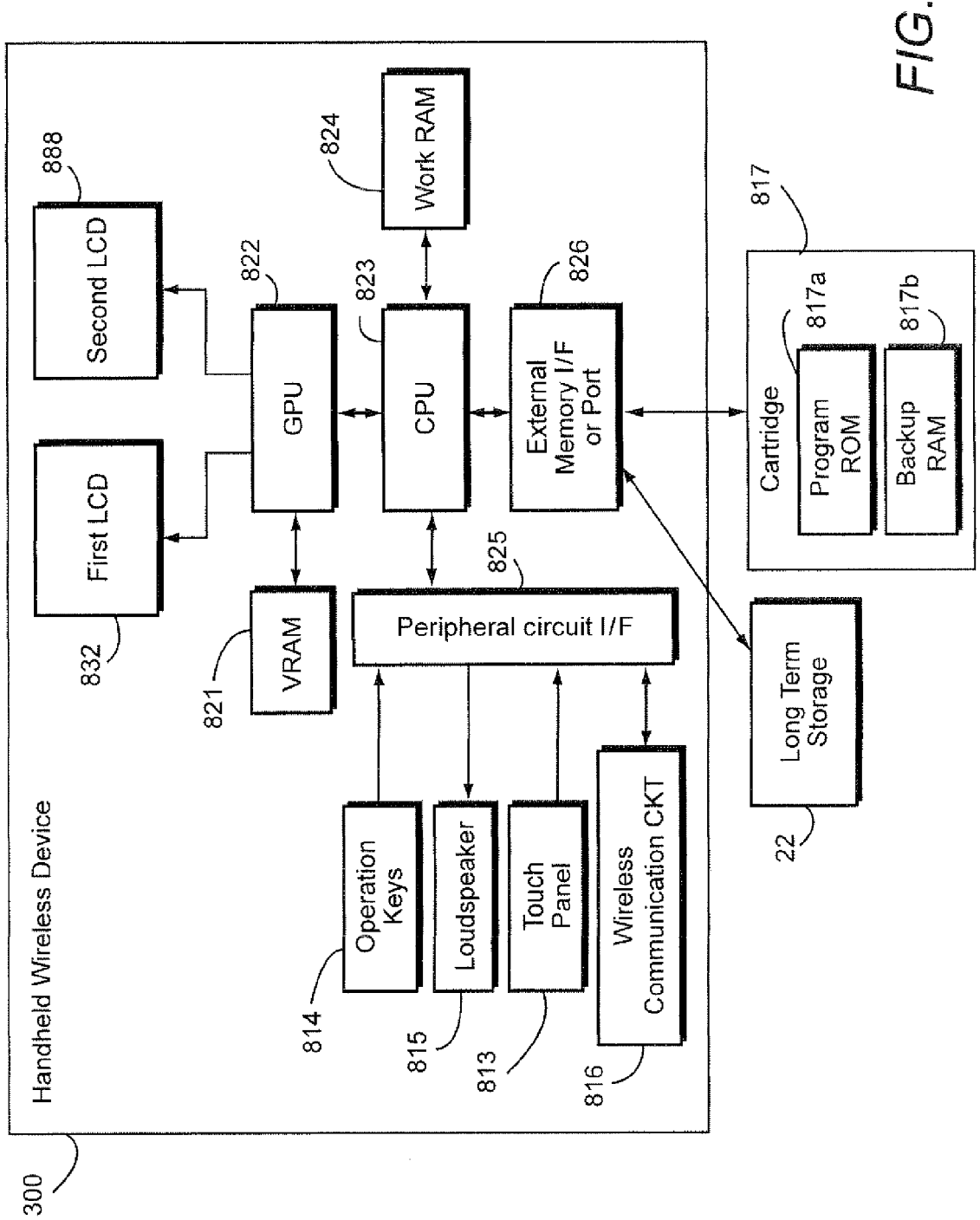
FIG. 16 is an illustration showing an example internal configuration of the handheld gaming device shown in FIG. 11.

FIG. 16 is an illustration showing an example internal configuration of the Nintendo DS game system 300 includes a CPU 823 comprised of first and second data processors and other components. The CPU 823 is coupled to a work or working RAM (working storage unit) 824, a GPU (graphic processing unit) 822, a peripheral circuit I/F (interface) 825 that are electrically connected to one another, and an external memory interface or port 826. The CPU 823 includes a first data processor for executing a kernel and network drivers for the server device, and a second data processor is used to execute a kernel and server applications. The work RAM 824 is a memory for temporarily storing, for example, the game program to be executed by the CPU 823 and calculation results of the CPU 823. There is no memory management unit (MMU), so application should not run outside of their intended memory allocation. The GPU 822 uses, in response to an instruction from the CPU 823, a VRAM 821 to generate a game image for display output to first LCD 832 and second LCD 888, and causes the generated game image to be displayed on the first display screen 332 of the first LCD 832 and on the second display screen 388 of the second LCD 888. The peripheral circuit I/F 825 is a circuit for transmitting and receiving data between external input/output units, such as the touch panel 313, the operation keys 314, the loudspeaker 315, and wireless communication circuit 816, and the CPU 823. The touch panel 313 (including a device driver for the touch panel) outputs coordinate data corresponding to a position input (specified) with the stylus 371. The wireless communication circuit 816 may be configured for wireless communication in accordance with any of various known wireless protocols such as Bluetooth, any type of 802.11 (Wi-Fi) protocol, HiperLAN/1 protocol, HiperLAN/2 protocol, HomeRF protocol, etc. Although shown as a single block, wireless communication circuit 816 encompasses arrangements in which two or more different protocols are usable or two or more different circuits (e.g., one for short-range communications such as WiFi and another for long-range communications using, for example, wireless telephone protocols) are provided.

The CPU 823 is electrically connected to the external memory I/F or port 826. For a server device, the port couples to a long term storage device 22 as already described. For a client device, a cartridge 817 may be inserted via slot 364. The cartridge 817 is a storage medium for storing a game program in a program ROM 817a and also includes a backup RAM 817b for rewritably storing backup data. A game or other application programs stored in the long term storage 22 or the program ROM 817a of the cartridge 817 are loaded to the work RAM 824 and then executed by the CPU 823. Game and other applications program may also be supplied via the wireless communication circuitry.

Figure 17:
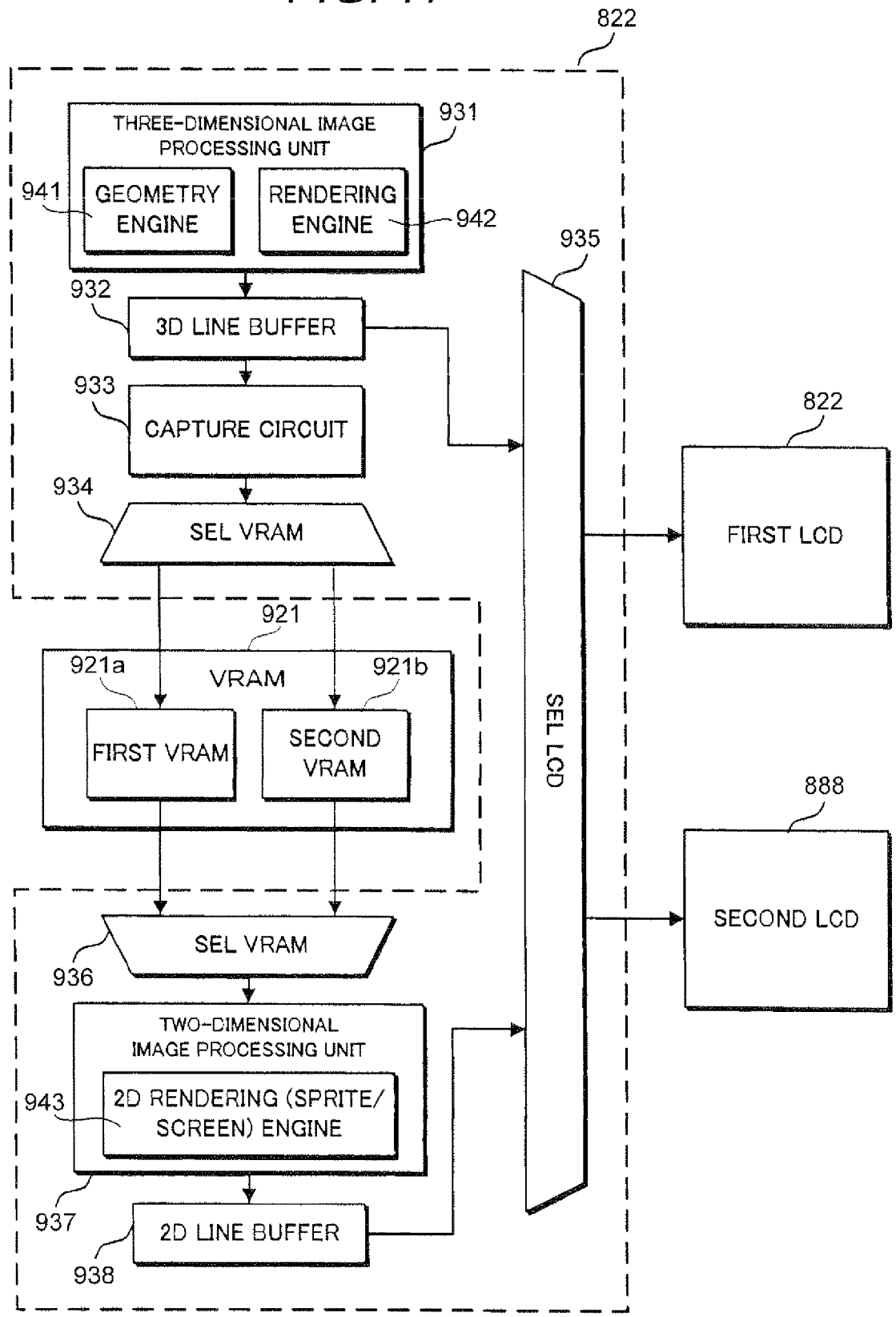
FIG. 17 is an illustration showing an example internal configuration of a graphics processing unit.

FIG. 17 is a block diagram of an example configuration for the GPU 822. The GPU 822 includes two image processing units, that is, a three-dimensional image processing unit 931 and a two-dimensional image processing unit 937. The three-dimensional image processing unit 931 includes a geometry engine 941 for calculating each vertex of a three-dimensional model based on three-dimensional model data and a rendering engine 942 for generating a game image from the three-dimensional model disposed on a virtual three-dimensional game space. The two-dimensional image processing unit 937 includes a 2D rendering engine 943 for generating a game image based on two-dimensional image data representing characters and two-dimensional image data representing backgrounds. More specifically, the two-dimensional image processing unit 937 disposes a two-dimensional image representing a character on a virtual screen called a "sprite" and a two-dimensional image representing a background on a virtual screen called a "screen", and then synthesizes these virtual screens to generate a game image to be eventually displayed.

The three-dimensional image processing unit 931 is connected to the 3D line buffer 932. The 3D line buffer 932 is a buffer memory for temporarily retaining image data for one scanning line of the first LCD 332 (or the second LCD 388). The image data generated by the three-dimensional image processing unit 931 is stored in this 3D line buffer 932 sequentially by one line.

The 3D line buffer 932 is connected to a capture circuit 933 and an LCD selector (SEL LCD) 935. The capture circuit 933 sequentially reads image data for one line stored in the 3D line buffer 932 and then sequentially stores the read image data in the VRAM 921, which will be described further below, thereby capturing the game image generated by the three-dimensional image processing unit 931.

The capture circuit 933 is connected to a VRAM selector (SEL VRAM) 934. The VRAM 921 is provided with two VRAMs, that is, a first VRAM 921a and a second VRAM 921b. Instead of these two first and second VRAMs 921a and 921b, a single VRAM may be used with its two different storage areas being used as the first VRAM 921a and the second VRAM 921b. The VRAM selector 934 switches an output destination of the capture circuit 933 between the first VRAM 921a and the second VRAM 921b. The first VRAM 921a and the second VRAM 921b are connected to a VRAM selector (SEL VRAM) 936. The VRAM selector 936 switches a source of data to the two-dimensional image processing unit 937 between the first VRAM 921a and the second VRAM 921b.

The two-dimensional image processing unit 937 is connected to a 2D line buffer 938. As with the 3D line buffer 932, the 2D line buffer 938 is a buffer memory for temporarily retaining image data for one scanning line of the second LCD 388. The image data generated by the two-dimensional image processing unit 937 is stored in this 2D line buffer 938 sequentially by one line.

The 2D line buffer 938 is connected to an LCD selector 935. The LCD selector 935 switches an output destination of the 3D line buffer 932 between the first LCD 332 and the second LCD 388, and an output destination of the 2D line buffer 938 between the first LCD 332 and the second LCD 388. In one example embodiment, the LCD selector 935 performs control such that, when the output of the 3D line buffer 932 is supplied to the first LCD 332, the output of the 2D line buffer 938 is supplied to the second LCD 388, and when the output of the 3D line buffer 932 is supplied to the second LCD 388, the output of the 2D line buffer 938 is supplied to the first LCD 332.

Additional information regarding handheld gaming system 300 may be found in application Ser. Nos. 11/111,985 filed Apr. 22, 2005 and 10/921,957, filed Aug. 20, 2004, the contents of which are incorporated herein in their entirety.

In a non-limiting example system using the handheld game system described with reference to FIGS. 11-17, an application may only need to use the wireless network hardware on the game system. As an example, the handheld game system includes one or more drivers using the wireless hardware on the game system for a proprietary wireless network and one or more drivers using the wireless hardware on the game system for a standardized wireless network such as the 802.11 family of standards. The proprietary network can be used to download the initial multiboot image or "core" program for the client system. The client system may include any information about the site, for example, information required to establish connection with the various access points within the site, and login information. The client system may then proceed to download other information about the site (e.g., restrooms, hours of operation, color schemes, fonts and basic applications, map of attractions, etc.)

Figure 18:
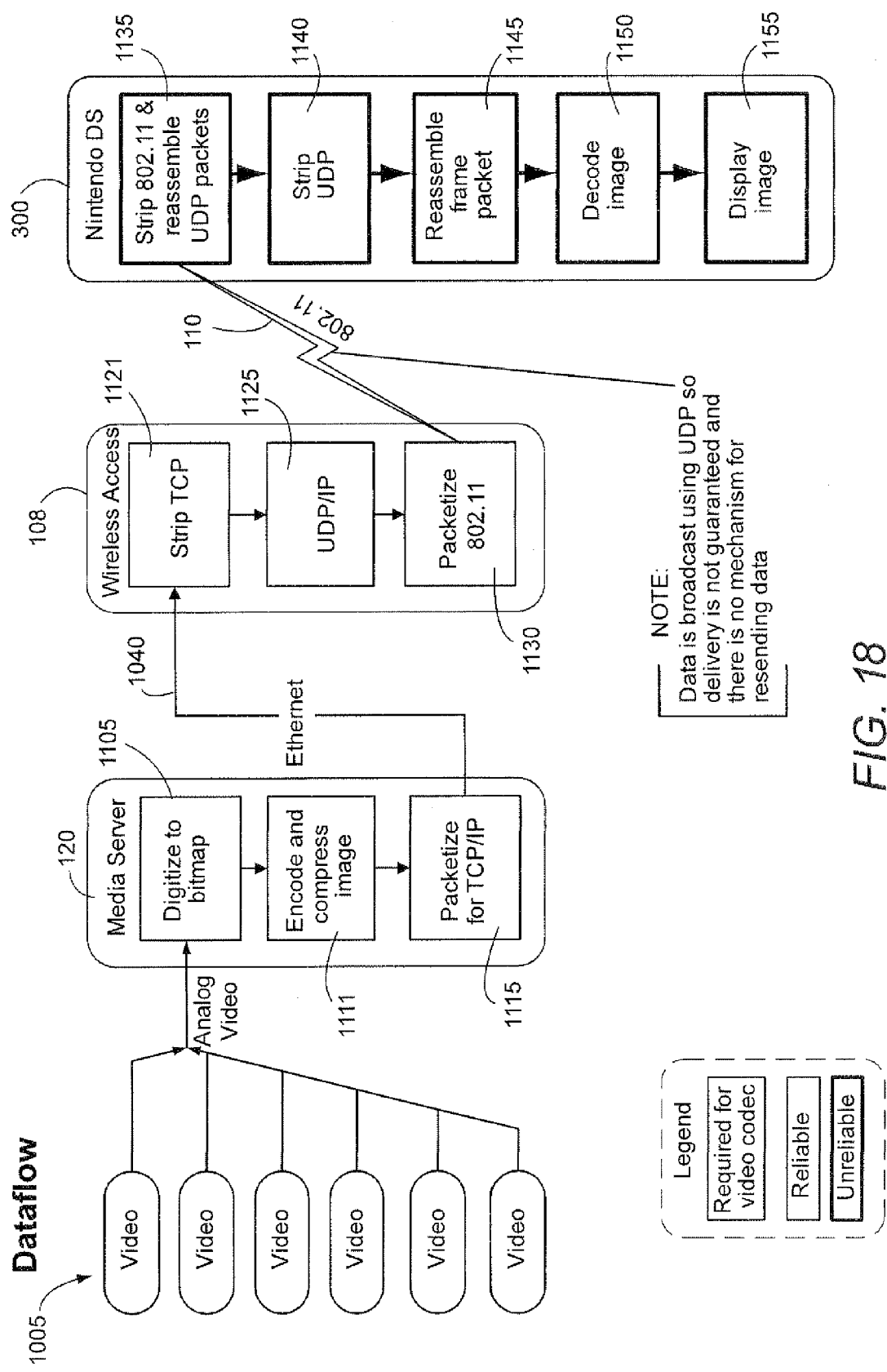
FIG. 18 shows an example communications network for wirelessly communicating and streaming video with the handheld gaming device shown in FIG. 11.

FIG. 18 shows an example data flow from the video feeds 1005 to media server 120 to a wireless access point 108 to a handheld game system 300. The video feeds 1005 provide analog video to media server 120, where the video is digitized to bitmaps at 1105, the bitmaps are encoded and compressed at 1111 and packetized for TCP/IP at 1115. The packetized information is communicated over local area network 1040 to wireless access point 108.

The encoding may, for example, provide 15 frames per second at 256×192 pixels per video feed for up to six video feeds. In the example network, the encoding is preferably real time encoding with a 500 ms maximum acceptable latency so that continuous real time performance can be maintained. All feeds (six in the example network) are interleaved into one video stream for transmission over a single wireless channel as discussed in greater detail below.

Wireless access point 108 provides connection-oriented (TCP/IP) and connectionless (UDP) networking access for the network. At wireless access point 108, the TCP is stripped from the information at 1121. The information is then adapted for transmission via a broadcasting protocol such as UDP/IP at 1125. The information is then packetized for transmission using a wireless protocol such as one of the 802.11 protocols at 1130. The packetized information is then broadcast over the wireless link 110.

The information broadcast over wireless link 110 is received by handheld game system 300 and the 802.11 is stripped and the UDP packets are reassembled at 1135. The UDP is stripped at 1140 and the frame packet is reassembled at 1145. The image is decoded at 1150 and displayed on one or both of the display screens 332 and 388 at 1155.

In the example network, the decoder in the handheld game machine degrades gracefully with data errors and does not crash or hang-up on missing or bad data. That is, the decoder presents the best possible image with missing or bad data. The decoder may support error correction. Each video channel (256×192×16 bits) should fit within 128 kbps bandwidth. The output from the decoder is a bitmap that is displayed by the client application of the portable game system.

Although not shown in FIG. 18, a similar data flow may be provided for non-video information (e.g., statistics and other content) for output by the handheld wireless game system 300.

FIGS. 19A and 19B shows example protocol stacks. With reference to FIG. 19A, for example, at the access point 108 and the handheld game system 300, the stack includes a network packet, UDP, IP and WiFi driver. With reference to FIG. 19B, the access point stack includes a network packet, UDP, IP and WiFi driver and the portable game system stack includes a state machine, UDP, IP and WiFi driver.

Figure 20:
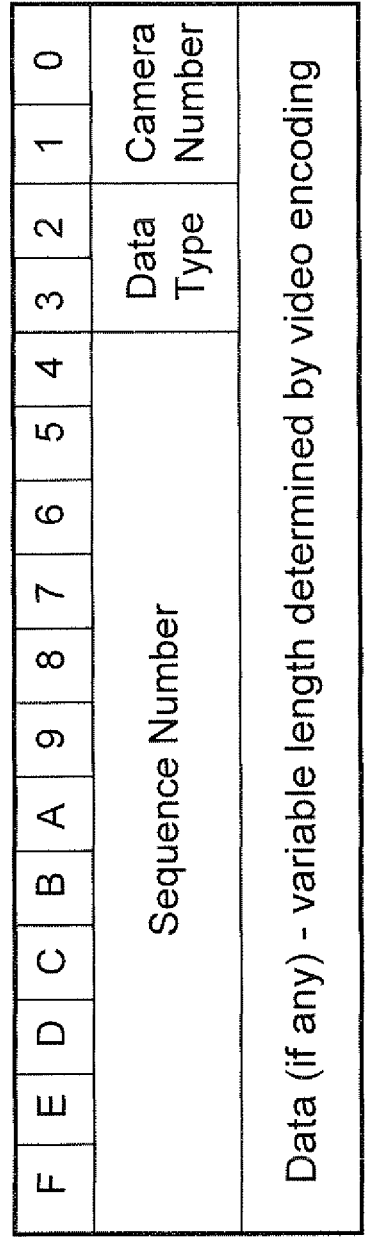
FIG. 20 shows an example network video packet format.

FIG. 20 shows an example network packet format which includes a 16-bit header with a 2 bit camera number field, a 2-bit data type field, and a 12-bit sequence number field. The data size is determined by the video encoding.

FIG. 21 shows an example UDP data format which includes a 16-bit source port number, a 16-bit destination port number, a 16-bit UDP length, a 16-bit UDP checksum and variable length data.

FIG. 22 shows an example IP header.

The systems and methods described herein also provide for securing data over a wireless link for credit card purchases and entry of personal information using multiple layers of standard encryption (DES), which may be coupled with a top layer of proprietary encryption.

The handheld information terminals can use dynamic program memory allocation, keeping a minimum application (kernel) in memory (e.g., RAM), while moving necessary code and data to RAM from servers and discarding (de-allocating) unnecessary code and data.

User identification and authentication may be provided via an exchange of data between the handheld wireless client terminal and server based on a mathematical operation using user's name and MAC address of the handheld wireless client terminal. This mathematical operation stores a unique number (e.g., a 16 byte number) in the handheld wireless client terminal which is used by the server to authenticate the user's identity. The server performs a series of operations using the unique number to ensure that the handheld wireless client terminal's security has not been compromised. An example implementation of this process may be as follows:

1. Seed a pseudorandom prime number generating algorithm with a number generated from the handheld wireless client terminal's MAC address. Create sixteen (16) prime numbers.

2. Create two vector spaces, one with 8 complex values from the 16 prime numbers, the other with 8 complex numbers derived from a Boolean operation of a number from application specific server and the user's name.

3. Mathematically convolve these two vectors into a new vector space. Store the 16 bytes resulting from the new vector (8 real values and 8 imaginary values) locally in the handheld wireless client terminal.

4. The server reads the 16 byte value and MAC address from the handheld wireless client terminal.

5. The server convolves these two values, and then uses a database lookup to identify the user's name.

6. The server then convolves the result with a value based on the user's name.

7. If the result is not a zero value vector, then security has likely been compromised.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A handheld wireless server for serving handheld wireless clients, the handheld wireless server comprising:
a handheld wireless gaming device functioning as a server including:
a battery;
data processing circuitry;
read/write working memory;
a memory port for receiving an external, detachable, long term, read/write storage device that stores multiple, dynamic server application programs for execution by the data processing circuitry and multiple, dynamic client application programs for download to one or more of the handheld wireless client devices;
wireless communications circuitry configured to broadcast initial information and detect communications from handheld wireless client devices including requests to download one of the client application programs stored on the long term storage device,
wherein the data processor is configured to, in parallel, process multiple download requests for one or more of the client application programs from multiple handheld wireless client devices, retrieve the client application programs from the long term storage device operably coupled to the memory port, and provide the client application programs wirelessly to the multiple handheld wireless client devices,
wherein the multiple requests include a first request from a first handheld wireless client device to download a first of the client application programs stored on the long term storage device and a second request from a second handheld wireless client device to download a second, different one of the client application programs stored on the long term storage device, and
wherein the data processor is configured to, in parallel, process the multiple download requests for the first and second different client application programs from the first and second handheld wireless client devices, retrieve the first and second different client application programs from the long term storage device operably coupled to the memory port, and provide the first and second different client application programs wirelessly to the first and second handheld wireless client devices, respectively.

2. The handheld wireless server in claim 1, wherein the handheld wireless gaming device is an embedded device adapted to perform predetermined server functions.

3. The handheld wireless server in claim 1, wherein the wireless gaming device is a dual screen handheld gaming device, wherein the dual screen handheld gaming device includes a boot cartridge port for receiving a boot cartridge that is configured to initialize the dual screen handheld gaming device to function as a wireless access point, and wherein a flash memory cartridge is received at the memory port to serve as the long term, read/write storage device.

4. The handheld wireless server in claim 1, wherein the handheld wireless clients are gaming clients and at least one server application program is used to start the client applications when provided to the handheld wireless client devices.

5. The handheld wireless server in claim 3, wherein the handheld wireless gaming clients are dual screen handheld gaming devices.

6. The handheld wireless server in claim 1, wherein the handheld wireless client device without the long term storage device operably coupled to the memory port weighs no more than 10 ounces and has dimensions no greater than 3.5" in width, 6" in length, and 1.25" in thickness.

7. The handheld wireless server in claim 1, wherein the long term storage device is flash memory or a hard disk.

8. The handheld wireless server in claim 6, wherein the flash memory is configured as a card, cartridge, disk, or stick and the memory port is sized to receive the card, cartridge, disk, or stick.

9. The handheld wireless server in claim 1, wherein the processing circuitry includes a first data processor for executing a kernel and network drivers and a second data processor for executing the server application programs.

10. The handheld wireless server in claim 9, wherein the processing circuitry further includes a graphics processing unit for processing two-dimensional and three-dimensional images.

11. The handheld wireless server in claim 1, wherein the wireless circuitry is configured to wirelessly communicate with one or more other handheld wireless gaming servers.

12. The handheld wireless server in claim 11, wherein the wireless circuitry is configured to wirelessly receive one or more application programs from the one or more other handheld wireless gaming servers and/or to wirelessly transmit one or more application programs to the one or more other handheld wireless gaming servers.

13. The handheld wireless server in claim 11, wherein the handheld wireless gaming servers are located on a transport vehicle.

14. The handheld wireless server in claim 13, wherein the handheld wireless gaming servers are located on an airplane.

15. The handheld wireless server in claim 14, wherein the wireless circuitry is configured to wirelessly communicate with another wireless access point on the airplane that is part of an airplane network.

16. The handheld wireless server in claim 1, wherein the wireless circuitry is configured to wirelessly communicate with another wireless access point that is coupled to the Internet.

17. The handheld wireless server in claim 1, wherein the wireless circuitry is configured to wirelessly communicate with the wireless access point using a first wireless protocol and to communicate with the handheld wireless clients using a second wireless protocol different from the first wireless protocol.

18. The handheld wireless server in claim 17, wherein the first wireless protocol is a standardized wireless protocol and the second wireless protocol is a proprietary protocol.

19. The handheld wireless server in claim 18, wherein the standardized wireless protocol is an 802.11 protocol.

20. The handheld wireless server in claim 17, wherein the standardized wireless protocol is modified in order to communicate information that is specific to the handheld wireless gaming devices.

21. The handheld wireless server in claim 20, wherein the wireless circuitry transmits a beacon signal that includes information about client application programs that can be downloaded to the handheld wireless client devices.

22. The handheld wireless server in claim 15, wherein the data processing circuitry is configured to retrieve at least some client applications from a content server connected to the Internet.

23. A handheld wireless gaming terminal for use by a traveler in a wireless network provided in a travel environment that has handheld wireless gaming devices functioning as wireless access points, each handheld wireless gaming device being associated with a different location in the travel environment, the handheld wireless gaming terminal comprising:
   a battery;
   data processing circuitry;
   read/write working memory;
   wireless communications circuitry configured to receive broadcast information including client application indicators from a one or more of the handheld wireless gaming devices functioning as wireless access points, to request download of one a plurality of client application programs from one of the handheld wireless gaming devices based on the broadcast information received from the one handheld wireless gaming device, and to receive the requested client application program downloaded from the one handheld wireless gaming device; and
   an interactive interface that changes depending on the location in the travel environment of the handheld wireless gaming device with which the handheld wireless gaming terminal communicates,
   wherein the interactive interface changes in accordance with an interface application program downloaded from the handheld wireless gaming device with which the handheld wireless terminal communicates, where different handheld wireless gaming devices download different interface application programs that reflect a stage associated with the travel environment including a pre-travel stage, a during travel stage, and a post-travel stage.

24. The handheld wireless terminal in claim 23, wherein the interactive interface comprises two separate display screens.

25. The handheld wireless terminal in claim 23, wherein the travel environment includes air travel and the pre-travel stage includes the traveler arriving at and moving through an airport terminal, the travel stage includes the traveler located in an airplane, and the post-travel stage includes the traveler departing the airport terminal.

26. The handheld wireless terminal in claim 25, wherein application programs downloadable from the wireless access points include one or more of the following application programs: streaming video, video games, video game demos, head to head interactive video games, high scores for video games, contests for highest video game score, outside plane video, traveler check-in, map of airport terminal, directions to a terminal gate, other flight information and options, delays, cancellations, map of flight path, flight progress details, connecting flight details, directions to taxis, rental cars, hotels, and possible activities and events at the traveler's destination, advertisements, on-plane shopping, information videos such as safety and destination, food and beverage ordering, travel guides, electronic copies of an in-flight magazine, foreign language instructions, web access, flight attendant call, overhead reading light control, restroom empty status, or warning to wrap up current activity based on altitude or time to landing.

27. The handheld wireless terminal 23, wherein the handheld wireless gaming device operating as a wireless access point is a dual screen handheld gaming device.

28. The handheld wireless terminal 27, wherein the handheld wireless gaming device operating as a wireless access point also operates as an application server to the handheld wireless gaming terminal.

29. A communications system, comprising:
   multiple handheld wireless gaming devices wirelessly linked together, each handheld wireless gaming device functions as a server to multiple handheld wireless gaming terminals, each handheld wireless gaming device including:
      a battery;
      data processing circuitry;
      read/write working memory;
      long term, mass read/write storage storing multiple server applications for execution by the data processing circuitry and multiple client applications for download to one or more of the handheld wireless client devices;
      wireless communications circuitry configured to transmit broadcast information, to receive requests from multiple ones of the handheld wireless gaming terminals to download one or more client applications, and to transmit the requested client applications to the requesting handheld wireless gaming terminals;
   each handheld wireless gaming terminal including:
      a battery;
      a data processing circuitry;
      read/write working memory;
      wireless communications circuitry configured to receive broadcast information from one of the handheld wireless gaming devices, to transmit a request to the one handheld wireless gaming device to download of one a plurality of applications, and to receive the requested application downloaded from the one handheld wireless gaming device,
   wherein the wireless communications circuitry for each handheld wireless gaming device is configured to:
      receive multiple requests including a first request from a first handheld wireless client device to download a first of the client applications stored on the long term storage device and a second request from a second handheld wireless client device to download a second, different one of the client applications stored on the long term storage device, and process, in parallel, the multiple download requests for the first and second different client application programs from the first and second handheld wireless client devices, retrieve the first and second different client application programs from the long term, mass read/write storage, and provide the first and second different client applications wirelessly to the first and second handheld wireless client devices, respectively.

30. The system in claim 29, wherein at least some of the handheld wireless gaming devices download applications to others of the handheld wireless gaming devices.

31. The system in claim 29, further comprising a local area network including multiple wireless access points, wherein the wireless access points are configured to communicate wirelessly with the handheld wireless gaming devices and with the handheld wireless gaming terminals.

32. The system in claim 29, wherein at least some of the handheld wireless gaming devices are coupled to an application content server via the local area network or the Internet.

33. The system in claim 29, wherein the wireless server performs a multiboot server function and a file serving server function.

34. The handheld wireless server in claim 1, wherein the handheld wireless gaming device performs a multiboot server function and a file serving server function.

35. The handheld wireless server in claim 1, wherein the handheld wireless gaming device is of a size and weight that permits holding in one hand during normal operation using fingers of one or both hands.

36. The handheld wireless gaming terminal in claim 23, wherein the handheld wireless gaming terminal is of a size and weight that permits holding in one hand during normal operation using fingers of one or both hands.

37. The system in claim 29, wherein each of the multiple handheld wireless gaming devices is of a size and weight that permits holding in one hand during normal operation using fingers of one or both hands.

* * * * *